US012777161B2

(12) United States Patent
Chen et al.

(10) Patent No.: US 12,777,161 B2
(45) **Date of Patent: *Oct. 27, 2026**

(54) ADJUSTMENT BASED LOCAL ILLUMINATION COMPENSATION

(71) Applicant: Tencent America LLC, Palo Alto, CA (US)

(72) Inventors: Lien-Fei Chen, Palo Alto, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,821

(22) Filed: Oct. 31, 2024

(65) Prior Publication Data

US 2025/0056005 A1 Feb. 13, 2025

Related U.S. Application Data

(63) Continuation of application No. 17/903,697, filed on Sep. 6, 2022, now Pat. No. 12,166,998.

(Continued)

(51) Int. Cl.

| | |
|---|---|
| ***H04N 19/14*** | (2014.01) |
| ***H04N 19/105*** | (2014.01) |
| ***H04N 19/176*** | (2014.01) |

(52) U.S. Cl.

CPC ........... *H04N 19/14* (2014.11); *H04N 19/105* (2014.11); *H04N 19/176* (2014.11)

(58) Field of Classification Search

CPC ...... H04N 19/70; H04N 19/186; H04N 19/46; H04N 19/124; H04N 19/172; H04N 19/132

See application file for complete search history.

(56) References Cited

U.S. PATENT DOCUMENTS

| | | | | |
|---|---|---|---|---|
| 10,887,597 | B2 | 1/2021 | Liu et al. | |
| 10,904,548 | B2 * | 1/2021 | Karczewicz | ........... H04N 19/18 |

(Continued)

FOREIGN PATENT DOCUMENTS

| | | |
|---|---|---|
| WO | 2020/185496 A1 | 9/2020 |

OTHER PUBLICATIONS

Extended European Search Report and Search Opinion received for European Application No. 22920968.9, mailed on Apr. 4, 2025, 11 pages.

(Continued)

*Primary Examiner* — Daniel Chang

(74) *Attorney, Agent, or Firm* — ArentFox Schiff LLP

(57) ABSTRACT

A method for video decoding includes decoding prediction information of a current block indicating that local illumination compensation (LIC) is applied to the current block and an adjustment parameter used to adjust at least one parameter of the LIC. The method includes determining at least one of (i) a final scaling parameter $\alpha_f$ of the current block based on the adjustment parameter and an initial scaling parameter $\alpha_i$ that is included in the at least one parameter of the LIC and (ii) a final offset parameter $\beta_f$ of the current block based on the adjustment parameter and an initial offset parameter $\beta_i$ that is included in the at least one parameter of the LIC. The method includes determining an updated predictor of the current block based on (i) the at least one of $\alpha_f$ and $\beta_f$ and (ii) the predictor and reconstructing the current block based on the updated predictor.

20 Claims, 19 Drawing Sheets

Related U.S. Application Data

(60) Provisional application No. 63/298,788, filed on Jan. 12, 2022.

(56) References Cited

U.S. PATENT DOCUMENTS

| | | | | |
|---|---|---|---|---|
| 11,019,353 | B2 * | 5/2021 | Panusopone | H04N 19/50 |
| 11,381,839 | B2 * | 7/2022 | Zheng | H04N 19/52 |
| 11,659,162 | B2 * | 5/2023 | Liu | H04N 19/52 375/240.12 |
| 11,689,727 | B2 * | 6/2023 | Leleannec | H04N 19/137 375/240.02 |
| 2009/0010340 | A1 | 1/2009 | Joung et al. | |
| 2013/0188715 | A1 * | 7/2013 | Seregin | H04N 19/52 375/240.16 |
| 2017/0150186 | A1 * | 5/2017 | Zhang | H04N 19/124 |
| 2017/0339404 | A1 * | 11/2017 | Panusopone | H04N 19/91 |
| 2017/0347095 | A1 * | 11/2017 | Panusopone | H04N 19/70 |
| 2018/0098087 | A1 * | 4/2018 | Li | H04N 19/132 |
| 2018/0310017 | A1 * | 10/2018 | Chen | H04N 19/52 |
| 2018/0359483 | A1 * | 12/2018 | Chen | H04N 19/70 |
| 2019/0238882 | A1 * | 8/2019 | Park | H04N 19/105 |
| 2020/0007889 | A1 * | 1/2020 | Chao | H04N 19/423 |
| 2020/0068218 | A1 * | 2/2020 | Chen | H04N 19/82 |
| 2020/0112716 | A1 * | 4/2020 | Han | H04N 19/105 |
| 2020/0112733 | A1 * | 4/2020 | Li | H04N 19/139 |
| 2020/0162743 | A1 * | 5/2020 | Park | H04N 19/513 |
| 2020/0221078 | A1 * | 7/2020 | Seregin | H04N 19/86 |
| 2020/0288157 | A1 * | 9/2020 | Li | H04N 19/105 |
| 2020/0336738 | A1 * | 10/2020 | Xiu | G06F 17/18 |
| 2020/0413045 | A1 * | 12/2020 | Zhang | H04N 19/523 |
| 2021/0006784 | A1 * | 1/2021 | Lim | H04N 19/11 |
| 2021/0006787 | A1 * | 1/2021 | Zhang | H04N 19/593 |
| 2021/0006788 | A1 * | 1/2021 | Zhang | H04N 19/139 |
| 2021/0014523 | A1 * | 1/2021 | Poirier | H04N 19/105 |
| 2021/0021856 | A1 * | 1/2021 | Zheng | H04N 19/139 |
| 2021/0029356 | A1 * | 1/2021 | Zhang | H04N 19/136 |
| 2021/0029362 | A1 * | 1/2021 | Liu | H04N 19/105 |
| 2021/0037238 | A1 * | 2/2021 | Park | H04N 19/105 |
| 2021/0044834 | A1 * | 2/2021 | Li | H04N 19/107 |
| 2021/0051339 | A1 * | 2/2021 | Liu | H04N 19/105 |
| 2021/0051342 | A1 * | 2/2021 | Galpin | H04N 19/147 |
| 2021/0051345 | A1 * | 2/2021 | Tsai | H04N 19/52 |
| 2021/0195173 | A1 * | 6/2021 | Seregin | H04N 19/105 |
| 2021/0289201 | A1 | 9/2021 | Bang et al. | |
| 2021/0297703 | A1 | 9/2021 | Li et al. | |
| 2021/0314560 | A1 * | 10/2021 | Lai | H04N 19/105 |
| 2021/0352309 | A1 * | 11/2021 | Liu | H04N 19/159 |
| 2022/0038711 | A1 * | 2/2022 | Leleannec | H04N 19/176 |
| 2022/0078476 | A1 * | 3/2022 | Zhang | H04N 19/105 |
| 2022/0078488 | A1 * | 3/2022 | Leleannec | H04N 19/52 |
| 2022/0108652 | A1 * | 4/2022 | Su | G09G 3/3208 |
| 2022/0124343 | A1 * | 4/2022 | Filippov | H04N 19/176 |
| 2022/0239899 | A1 * | 7/2022 | Zhang | H04N 19/46 |
| 2022/0272326 | A1 * | 8/2022 | Xiu | G06F 17/18 |
| 2023/0103767 | A1 * | 4/2023 | Chang | H04N 19/105 375/240.12 |
| 2023/0104476 | A1 * | 4/2023 | Chen | H04N 19/52 375/240.02 |
| 2023/0262226 | A1 * | 8/2023 | Liu | H04N 19/176 375/240.02 |
| 2023/0396793 | A1 * | 12/2023 | Gao | H04N 19/105 |
| 2023/0396794 | A1 * | 12/2023 | Gao | H04N 19/105 |
| 2024/0073406 | A1 * | 2/2024 | Zhao | H04N 19/105 |
| 2024/0372996 | A1 * | 11/2024 | Gao | H04N 19/105 |

OTHER PUBLICATIONS

C.-C. Chen, V. Seregin, Y.-J. Chang, Z. Zhang, H. Huang, Y. Zhang, and M. Karczewicz, "EE2-related: Extension of template matching to Affine, CIIP, GPM merge modes, and boundary sub-blocks", ISO/IEC JTC1/SC29/WG11 JVET-V0118, Apr. 2021, pp. 1-3.

High Efficiency Video Coding, Rec. ITU-T H.265 v4 Dec. 2016, pp. 1-664.

International Search Report and Written Opinion received for PCT Patent Application No. PCT/US2022/076122, mailed on Dec. 6, 2022, 7 pages.

ITU-T and ISO/IEC, "Versatile Video Coding", ITU-T Rec. H.266 and ISO/IEC 23090-3, 2020, pp. 1-516.

Office Action received for Chinese Patent Application No. 202280008701.2, mailed on May 29, 2024, 11 pages (6 pages of English Translation and 5 pages of Original Document).

V. Seregin, et. al., "Exploration Experiment on Enhanced Compression beyond VVC capability", ISO/IEC JTC1/SC29/ WG11 JVET-U2024, Jan. 2021, pp. 1-19.

Y.-J. Chang, et. al., "Compression efficiency methods beyond VVC", ISO/IEC JTC1/SC29/WG11 JVET-U0100, Jan. 2021, pp. 1-13.

Y.-W. Chen, et. al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.

* cited by examiner

ADJUSTMENT BASED LOCAL ILLUMINATION COMPENSATION

INCORPORATION BY REFERENCE

The present application is a continuation of U.S. application Ser. No. 17/903,697, filed on Sep. 6, 2022, which claims the benefit of priority to U.S. Provisional Application No. 63/298,788, "ADJUSTMENT BASED LOCAL ILLUMINATION COMPENSATION" filed on Jan. 12, 2022. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode prediction information of one or more blocks from a coded video bitstream. The prediction information indicates that local illumination compensation (LIC) is applied to the one or more blocks and includes LIC information of the one or more blocks. The one or more blocks includes a current block to be reconstructed. The processing circuitry determines a final scaling factor $\alpha_{f1}$ of a first subblock in the current block and a final offset $\beta_{f1}$ of the first subblock in the current block based on the LIC information. The processing circuitry determines an updated first predictor subblock in a predictor corresponding to the current block based on the final scaling factor $\alpha_{f1}$, the final offset $\beta_{f1}$, and the first predictor subblock in the predictor. In an example, an updated value of a first sample in the first predictor subblock in the predictor is equal to $\alpha_{f1} \times p_{i1} + \beta_{f1}$ where $p_{i1}$ is a value of the first sample in the first predictor subblock in the predictor. The processing circuitry reconstructs the first subblock in the current block based on the updated first predictor subblock in the predictor.

In an embodiment, an initial scaling factor $\alpha_{i1}$ of the first subblock in the current block and an initial offset $\beta_{i1}$ of the first subblock in the current block are determined based on a first portion of a current template of the current block and a first portion of a reference template of a reference block. The predictor can be based on the reference block. The LIC information of the one or more blocks is signaled in the coded video bitstream and indicates at least one of a first parameter $\mu_1$ of the one or more blocks or a second parameter $\mu_2$ of the one or more blocks. The processing circuitry determines the final scaling factor $\alpha_{f1}$ of the first subblock in the current block based on the first parameter $\mu_1$ of the one or more blocks and the initial scaling factor $\alpha_{i1}$ of the first subblock in the current block. The processing circuitry determines the final offset $\beta_{f1}$ of the first subblock in the current block based on the second parameter $\mu_2$ of the one or more blocks and the initial offset $\beta_{i1}$ of the first subblock in the current block.

In an example, the LIC information of the one or more blocks indicates one of (i) the first parameter $\mu_1$ and (ii) the second parameter $\mu_2$, and another one of (i) the first parameter $\mu_1$ and (ii) the second parameter $\mu_2$ is determined based on the one of (i) the first parameter $\mu_1$ and (ii) the second parameter $\mu_2$.

In an example, one of (i) the first parameter $\mu_1$ and (ii) the second parameter $\mu_2$ is equal to zero, and the LIC information of the one or more blocks does not indicate the one of (i) the first parameter $\mu_1$ and (ii) the second parameter $\mu_2$.

In an example, the LIC information of the one or more blocks includes at least one index that indicates the at least one of the first parameter $\mu_1$ or the second parameter $\mu_2$.

In an example, the at least one of the first parameter $\alpha_1$ or the second parameter $\mu_2$ is a floating-point value and is quantized with multiple bits, and the LIC information of the one or more blocks includes the multiple bits.

In an example, the processing circuitry determines the final scaling factor $\alpha_{f1}$ of the first subblock in the current block to be a summation of the first parameter $\mu_1$ of the one or more blocks and the initial scaling factor $\alpha_{i1}$ of the first subblock in the current block.

In an example, the processing circuitry determines a parameter $T_{avg,1}$ of the first subblock in the current block based on at least one of the first portion of the current template or the first portion of the reference template, and determines the final offset $\beta_{f1}$ of the first subblock in the current block to be $(\beta_{i1}+\mu_2\times T_{avg,1})$.

In an example, the LIC information of the one or more blocks is signaled at a coding unit (CU) level.

In an example, the LIC information of the one or more blocks is signaled at a level that is higher than the CU level.

In an example, the first subblock includes the current block, the first predictor subblock includes the predictor, the first portion of the current template includes the current template, and the first portion of the reference template includes the reference template.

In an example, the current block includes the first subblock and a second subblock, the at least one of the first parameter $\mu_1$ or the second parameter $\mu_2$ indicated in the LIC information of the one or more blocks applies to the first subblock and the second subblock, and the second subblock is associated with another initial scaling factor $\alpha_{i2}$ that is different from the initial scaling factor $\alpha_{i1}$ of the first subblock and another initial offset $\beta_{i2}$ that is different from the initial offset of the first subblock.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
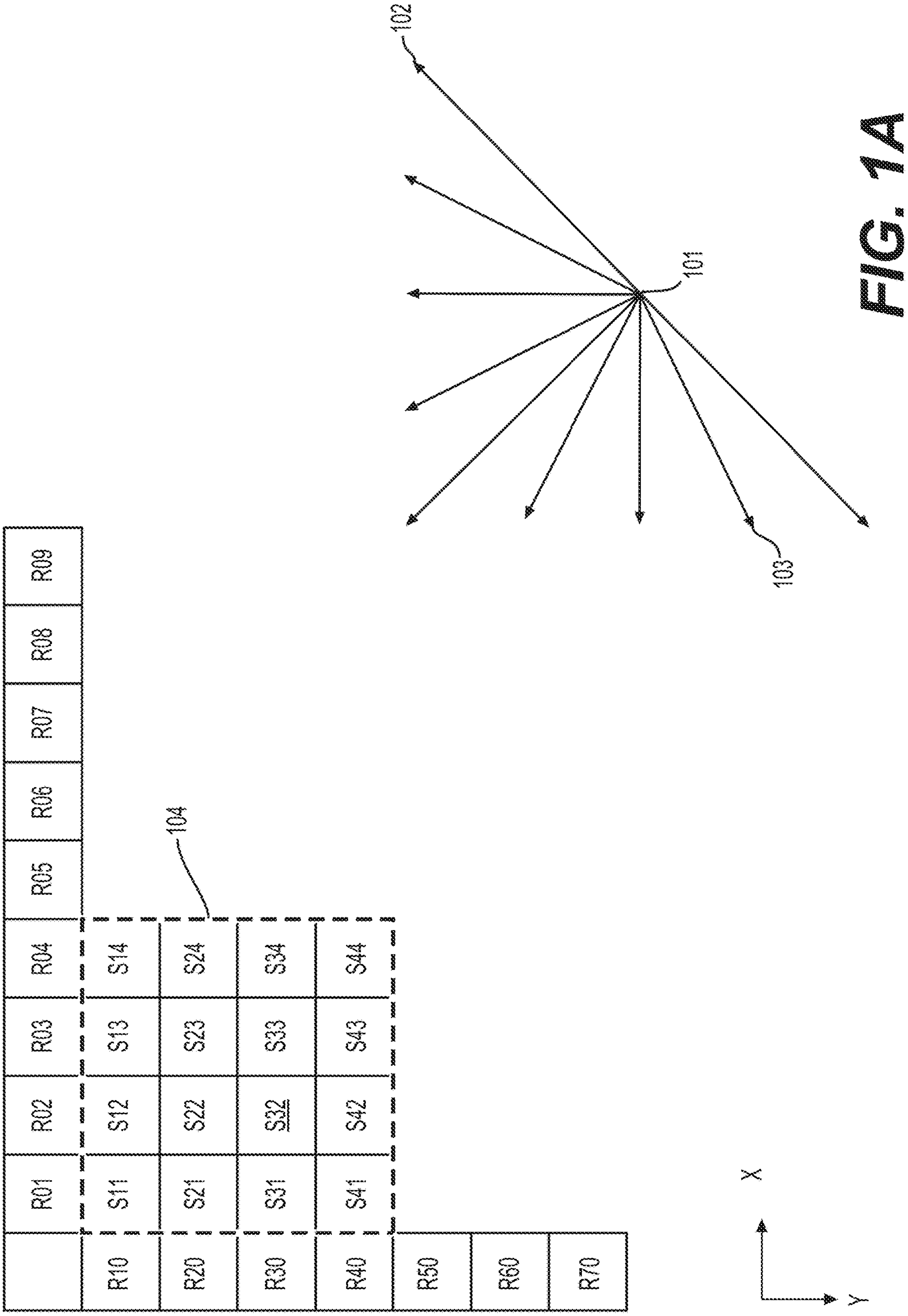
FIG. 1A is a schematic illustration of an exemplary subset of intra prediction modes.
Figure 1B:
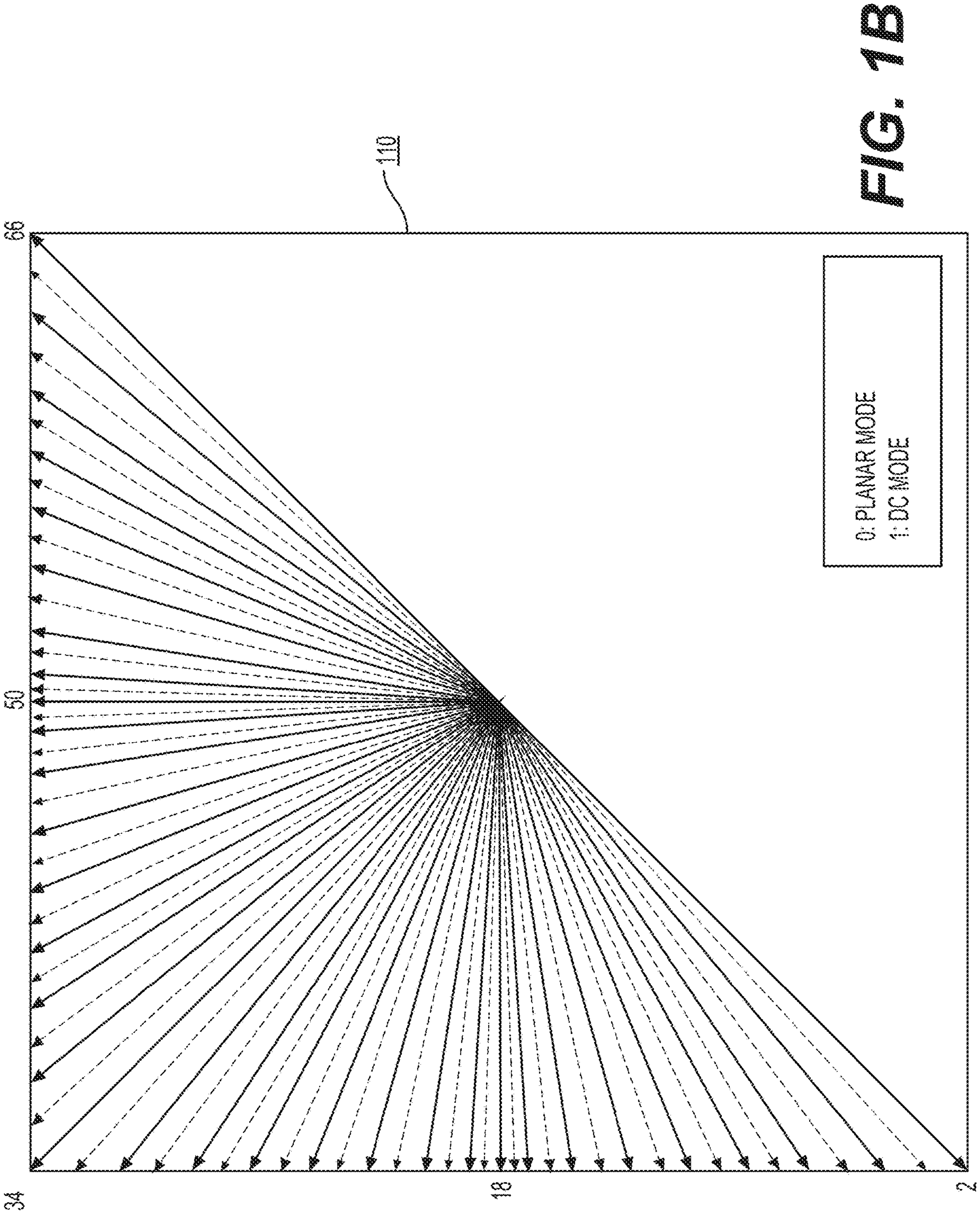
FIG. 1B is an illustration of exemplary intra prediction directions.
Figure 2:
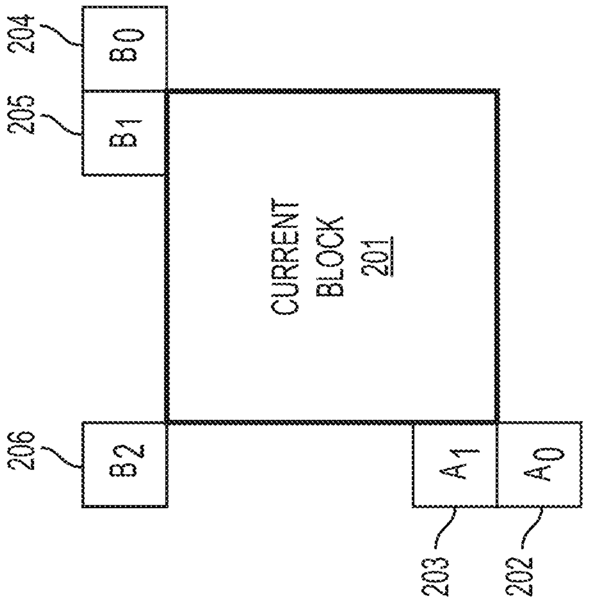
FIG. 2 (Related Art)
FIG. 2 shows an example of a current block (201) and surrounding samples.
Figure 3:
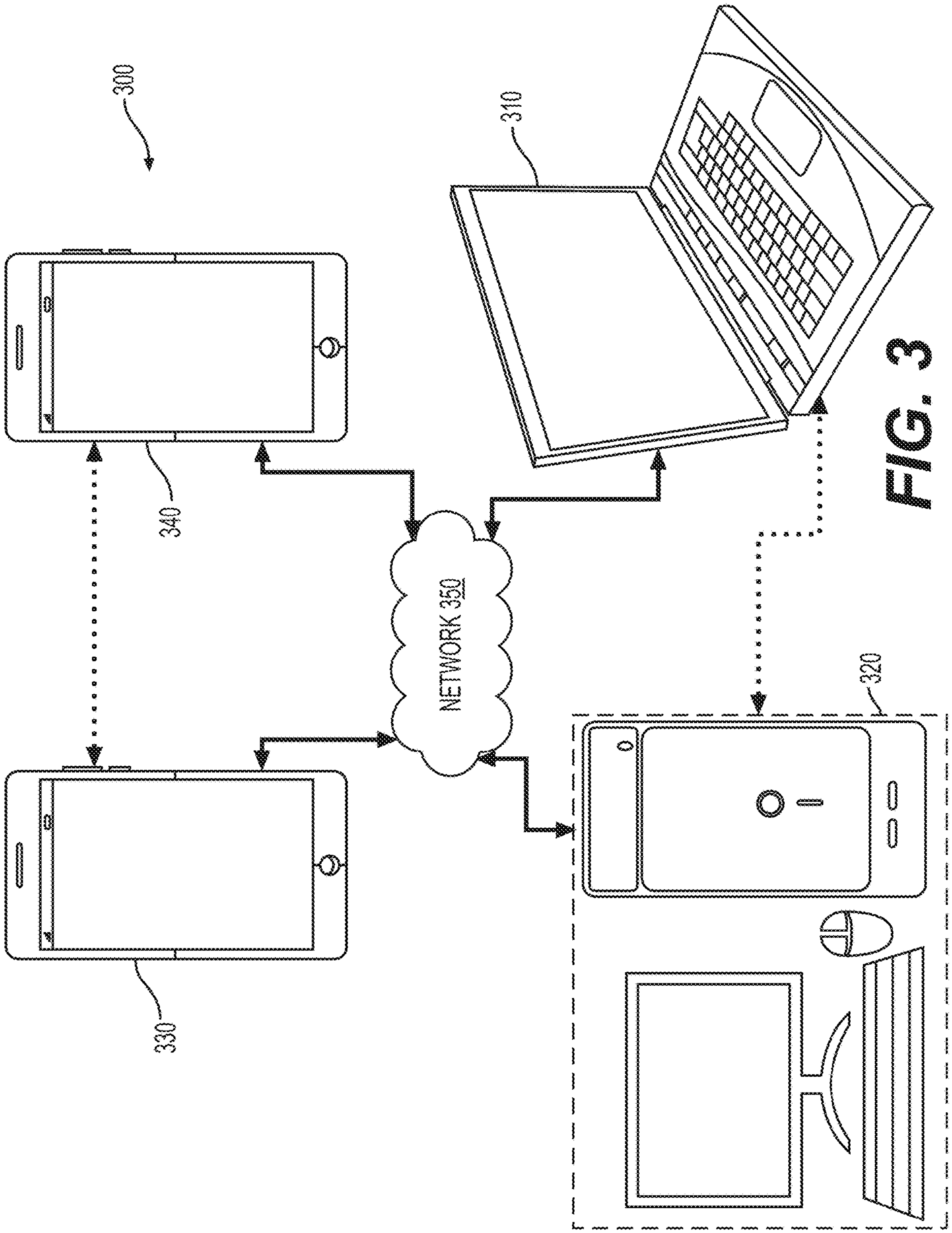
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
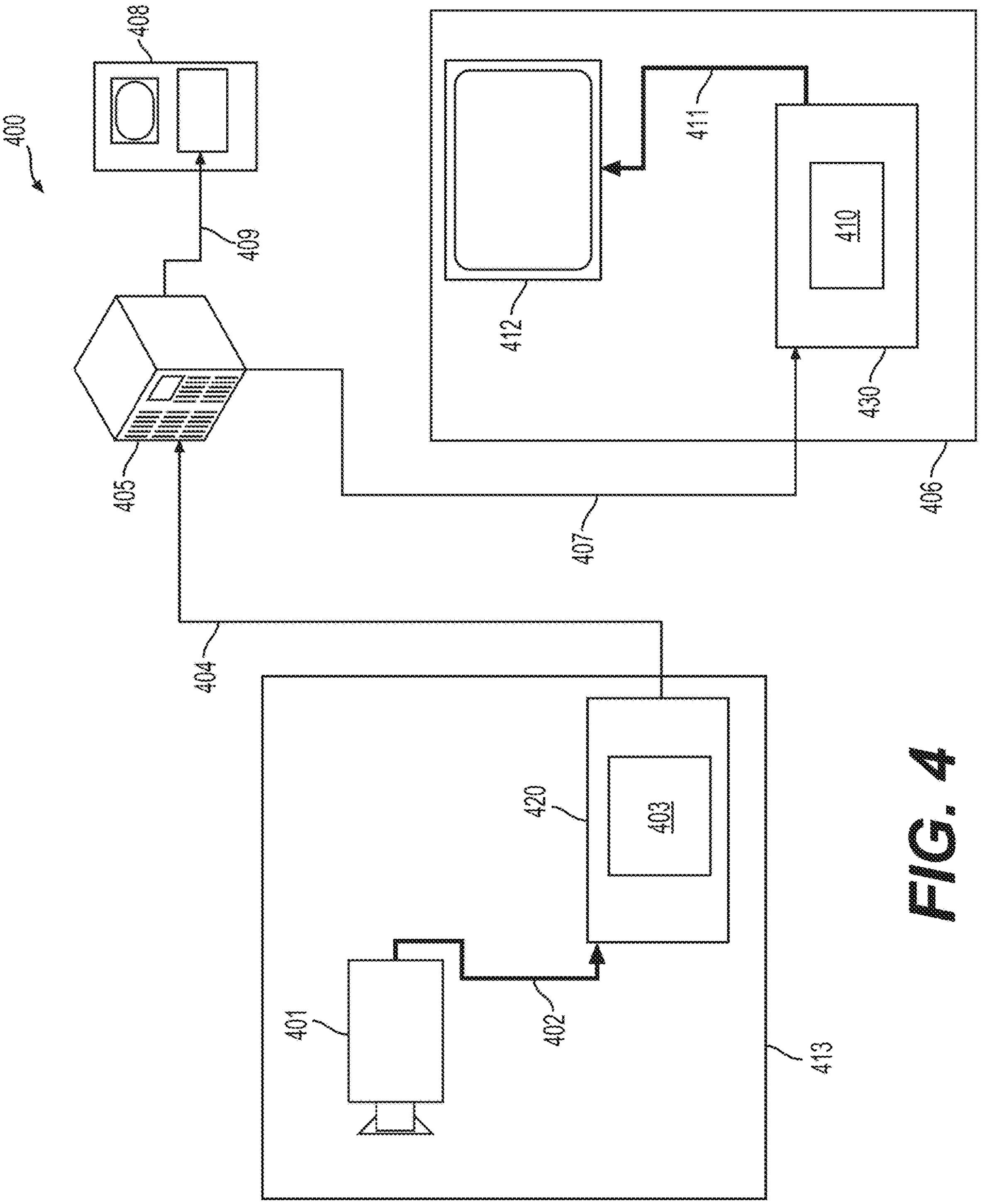
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
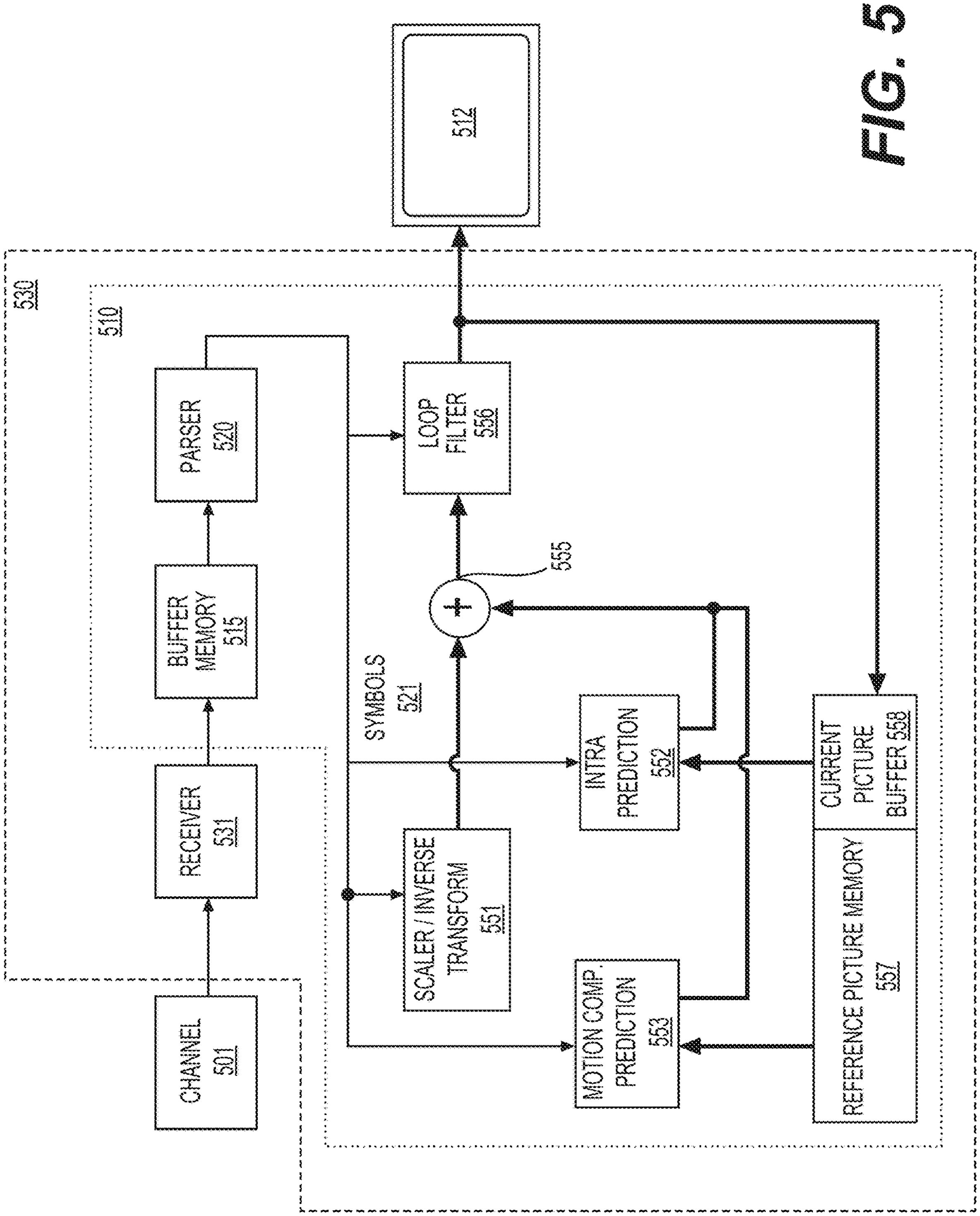
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
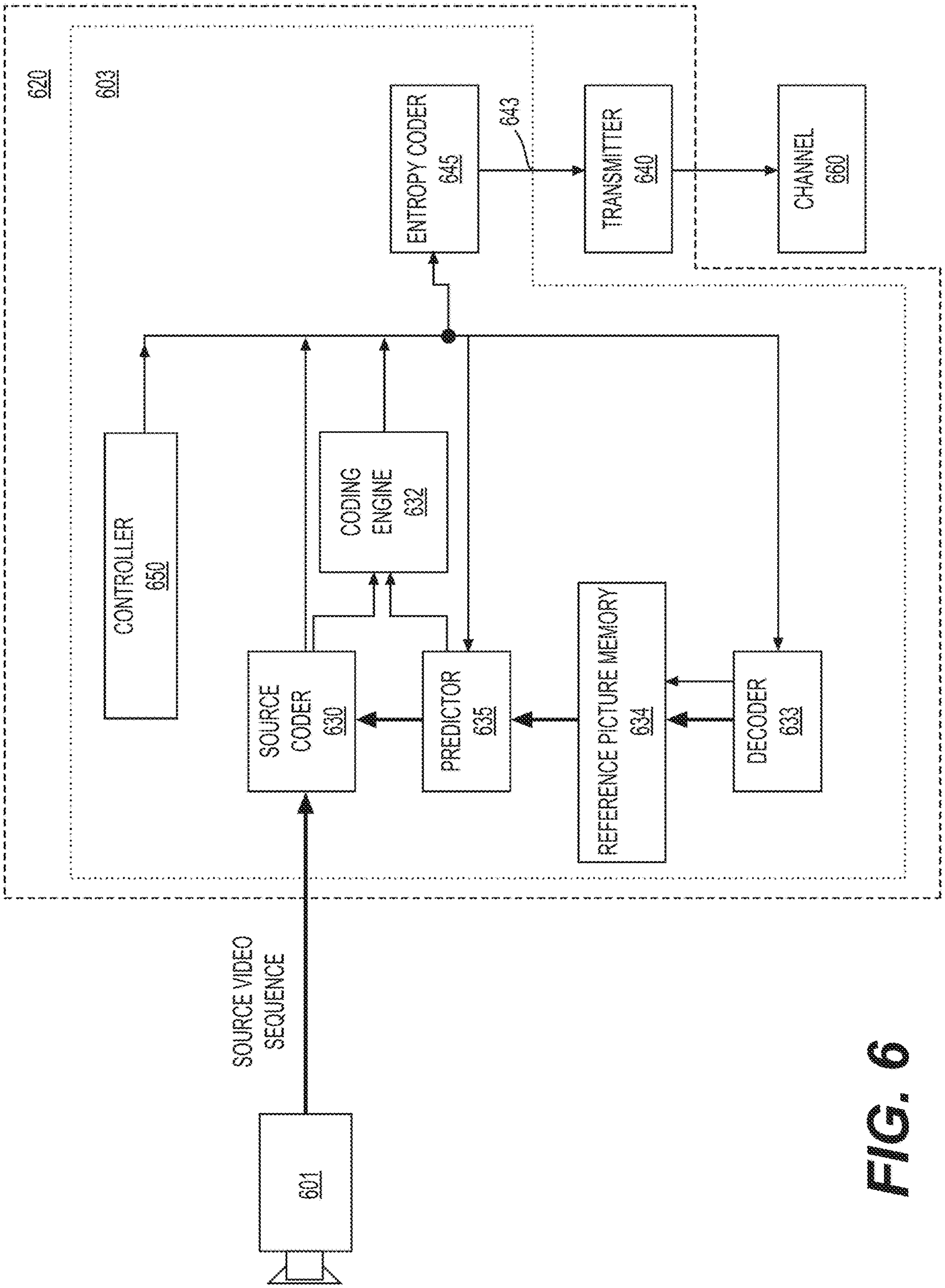
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
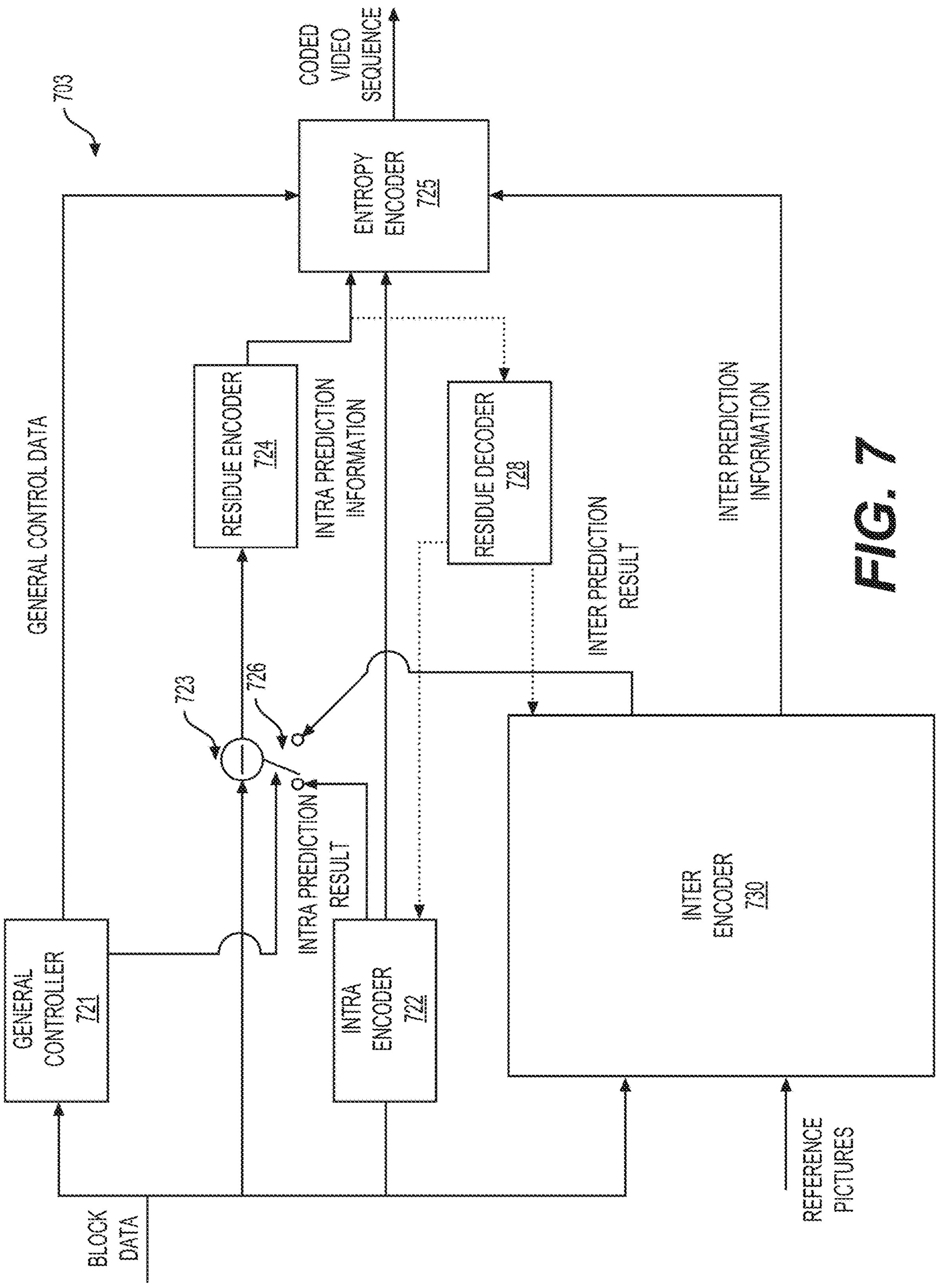
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
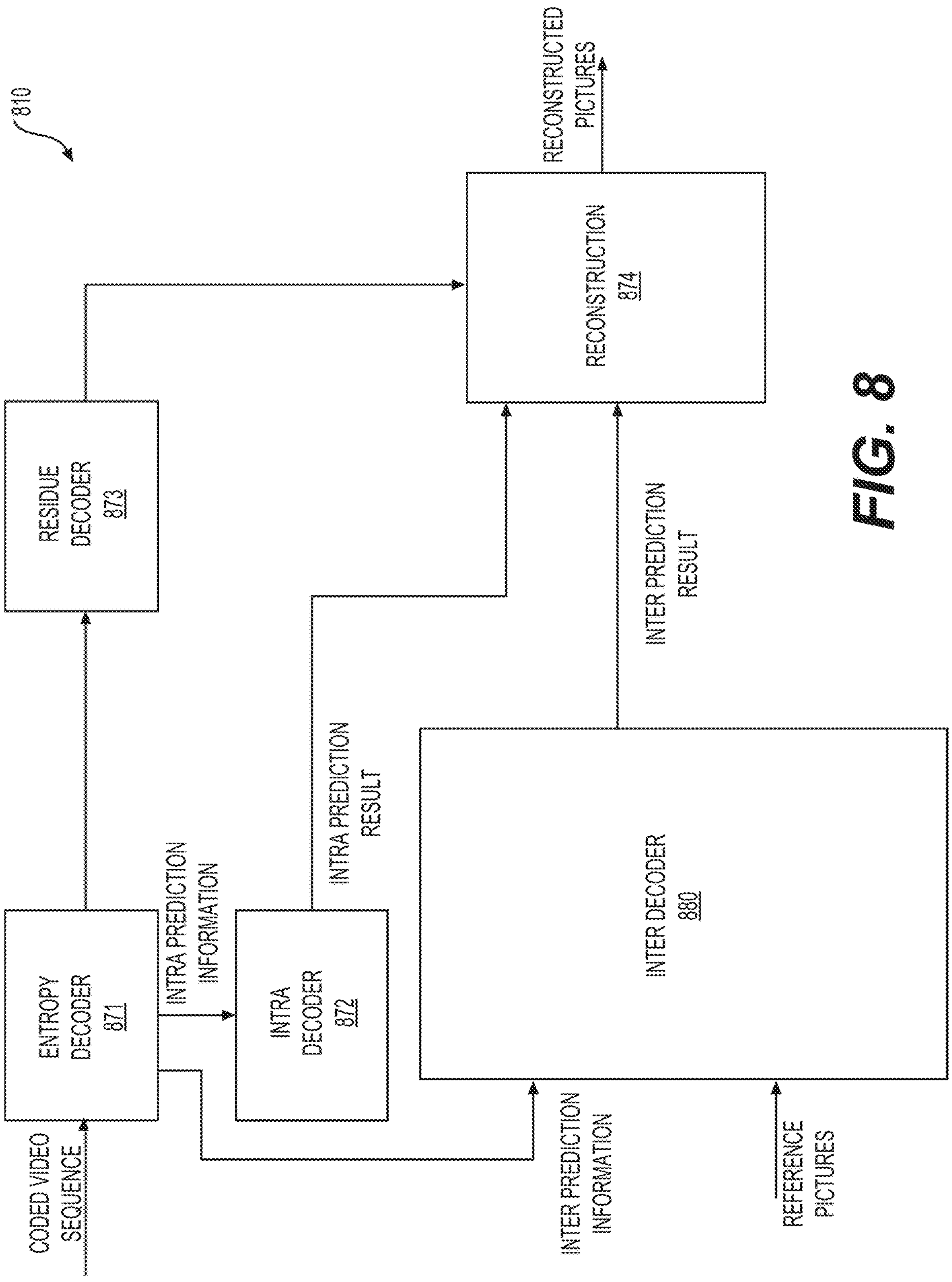
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
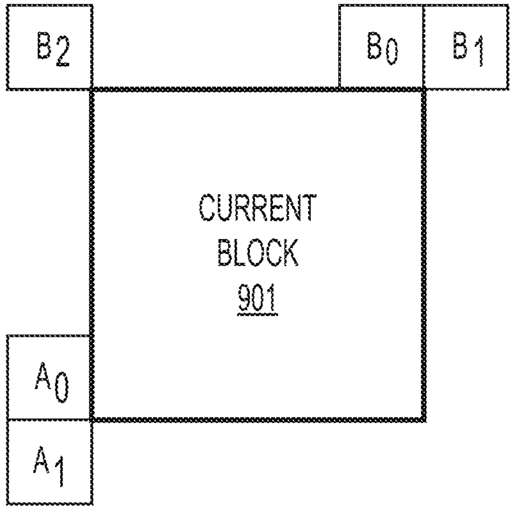
FIG. 9 shows positions of spatial merge candidates according to an embodiment of the disclosure.

Some examples of generation processes of different categories of merge candidates are provided below. In an embodiment, spatial candidate(s) are derived as follows. The derivation of spatial merge candidates, such as in VVC, can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g. because the CU belongs to another slice or another tile) or is intra coded. After a candidate at the position A1 is added, the addition of the remaining candidates is subject to a redundancy check which ensures that candidates with the same motion information are excluded from the candidate list so that coding efficiency is improved.

Figure 10:
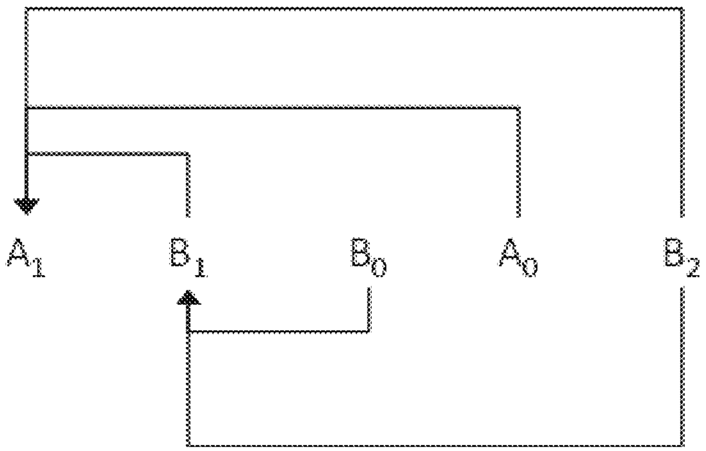
FIG. 10 shows candidate pairs that are considered for a redundancy check of spatial merge candidates according to an embodiment of the disclosure.

To reduce computational complexity, not all possible candidate pairs are considered in the mentioned redundancy check in some embodiments. Instead, only certain pairs, such as the pairs linked with an arrow in FIG. 10, are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
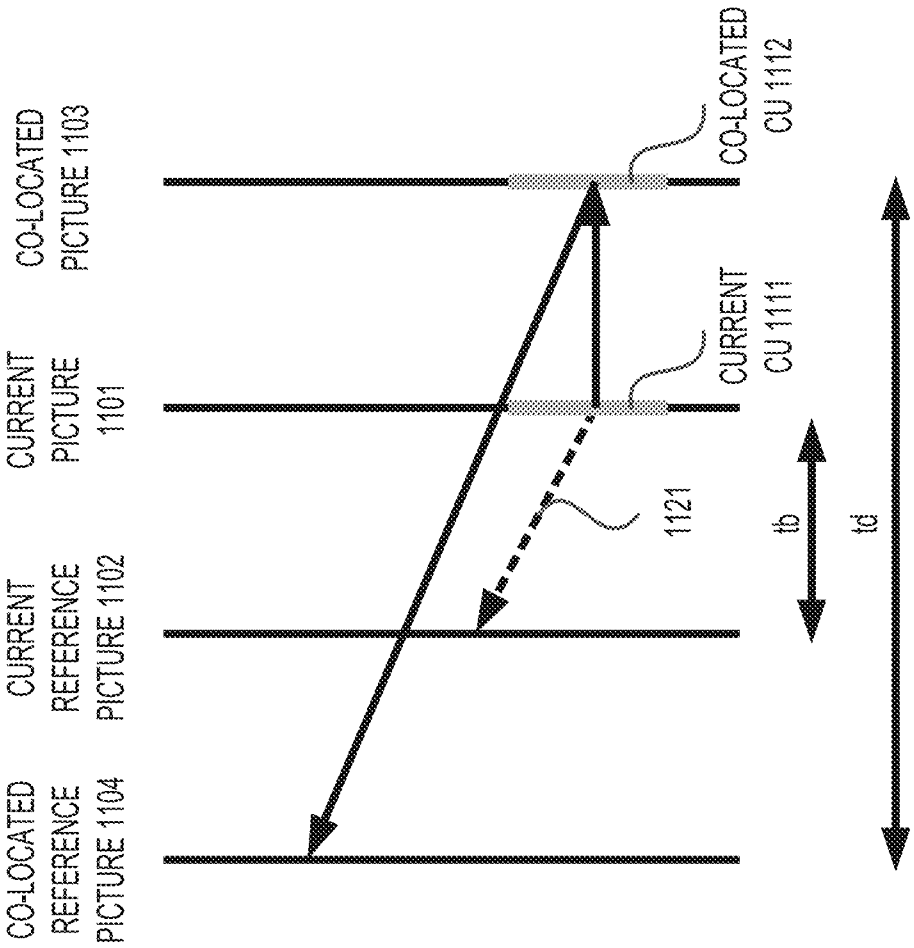
FIG. 11 shows exemplary motion vector scaling for a temporal merge candidate.

In an embodiment, temporal candidate(s) are derived as follows. In an example, only one temporal merge candidate is added to the candidate list. FIG. 11 shows an example of motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a collocated reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined as the POC difference between a current reference picture (1102) of the current picture (1101) and the current picture (1101). The POC distance td can be defined as the POC difference between the co-located reference picture (1104) of the co-located picture (1103) and the co-located picture (1103). A reference picture index of the temporal merge candidate can be set to zero.

Figure 12:
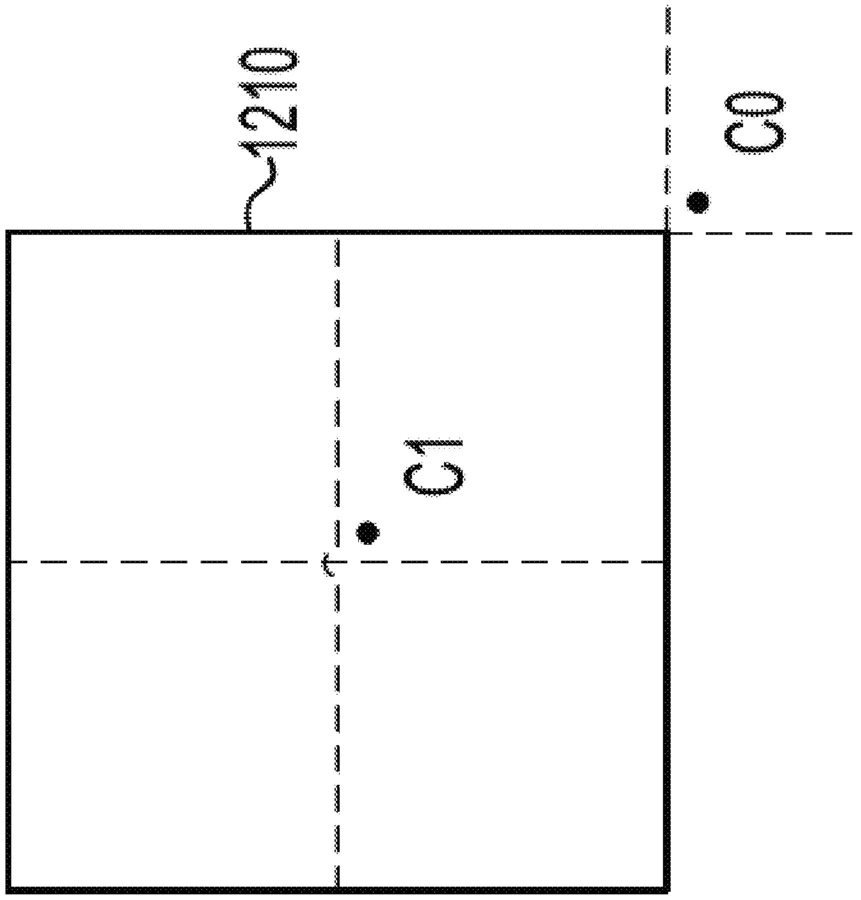
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (1210) of the current CU. The candidate position C1 is located at a center of the co-located CU (1210) of the current CU (1210). If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

Figure 13A:
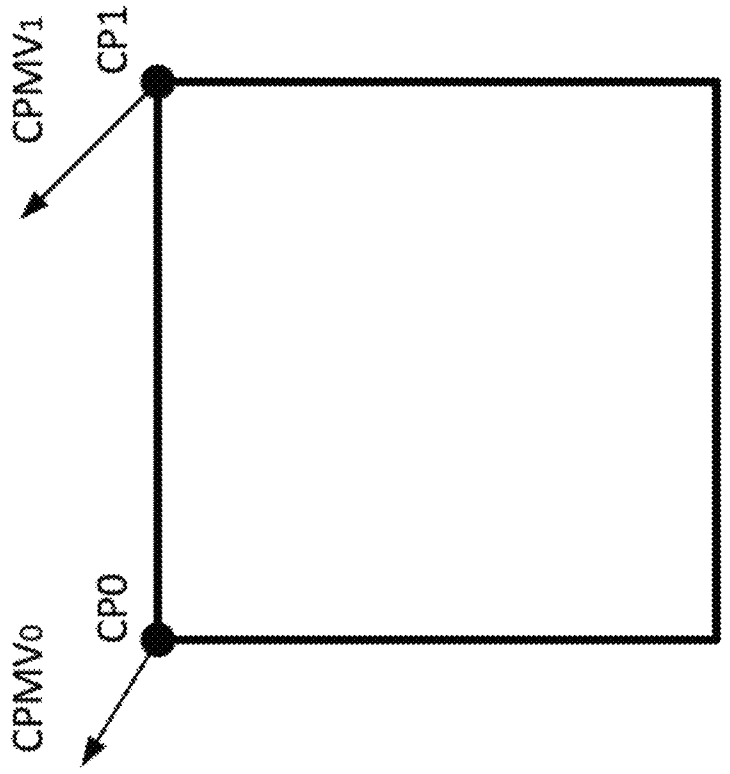
FIGS. 13A-13B show examples of affine models.
Figure 13B:
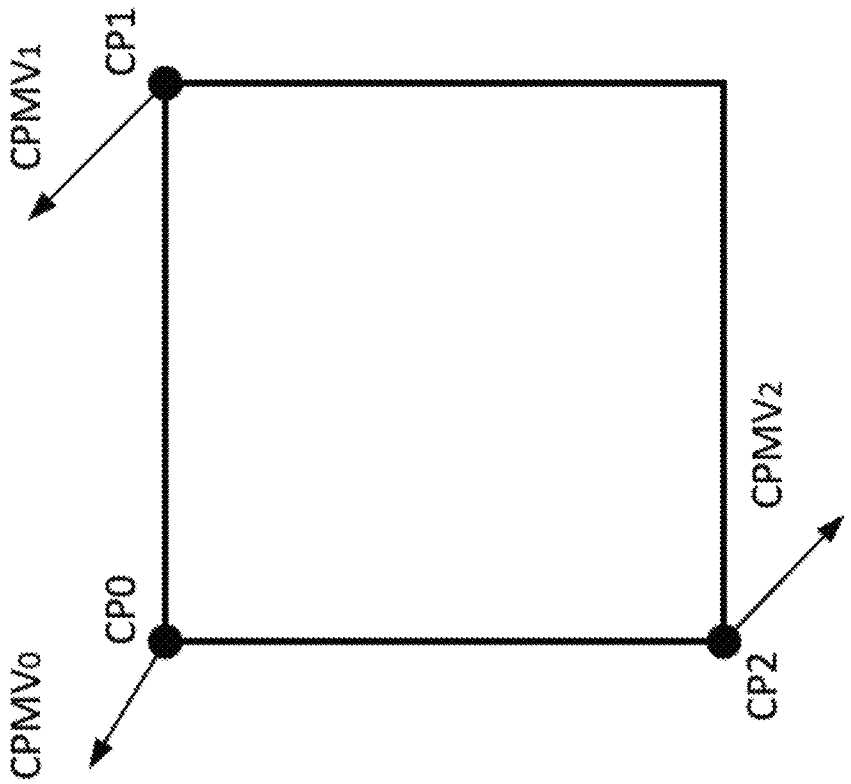

In some examples, a translation motion model is applied for motion compensation prediction (MCP). However, the translational motion model may not be suitable for modeling other types of motions, such as zoom in/out, rotation, perspective motions, and the other irregular motions. In some embodiments, a block-based affine transform motion compensation prediction is applied. In FIG. 13A, an affine motion field of a block is described by two control point motion vectors (CPMVs), CPMV0 and CPMV1, of two control points (CPs), CP0 and CP1 when a 4-parameter affine model is used. In FIG. 13B, an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{Eq. 1}$$

For a 6-parameter affine motion model, a motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. 2}$$

In Eqs. 1-2, $(mv_{0x}, mv_{0y})$ is a motion vector of the top-left corner control point, $(mv_{1x}, mv_{1y})$ is motion vector of the top-right corner control point, and $(mv_{2x}, mv_{2y})$ is motion vector of the bottom-left corner control point. In addition, the coordinate (x, y) is with respect to the top-left corner of the respective block, and W and H denotes the width and height of the respective block.

Figure 14:
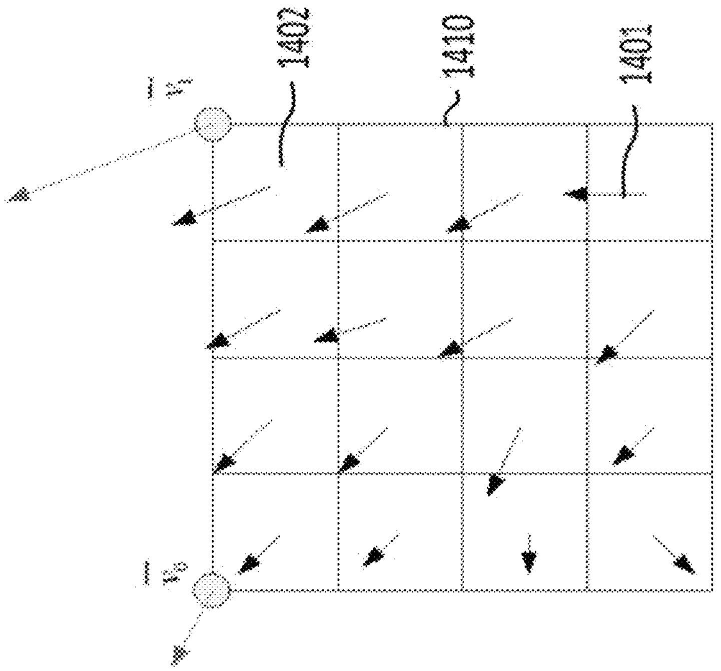
FIG. 14 shows an example of a sub-block based affine prediction.

In order to simplify the motion compensation prediction, a sub-block based affine transform prediction is applied in some embodiments. For example, in FIG. 14, the 4-parameter affine motion model is used, and two CPMVs, $\vec{v}_0$ and $\vec{v}_1$, are determined. To derive a motion vector of each 4×4 (samples) luma sub-block (1402) partitioned from the current block (1410), a motion vector (1401) of the center sample of each sub-block (1402) is calculated according to Eq. 1, and rounded to a 1/16 fraction accuracy. Then, motion compensation interpolation filters are applied to generate a prediction of each sub-block (1402) with the derived motion vector (1401). The sub-block size of chroma-components is set to be 4×4. A MV of a 4×4 chroma sub-block is calculated as the average of the MVs of the four corresponding 4×4 luma subblocks.

Similar to translational motion inter prediction, two affine motion inter prediction modes, affine merge mode and affine AMVP mode, are employed in some embodiments.

In some embodiments, an affine merge mode can be applied for CUs with both width and height larger than or equal to 8. Affine merge candidates of a current CU can be generated based on motion information of spatial neighboring CUs. There can be up to five affine merge candidates and an index is signaled to indicate the one to be used for the current CU. For example, the following three types of affine merge candidates are used to form an affine merge candidate list:

(i) Inherited affine merge candidates that are extrapolated from CPMVs of the neighbor CUs;
(ii) Constructed affine merge candidates that are derived using the translational MVs of the neighbor CUs; and
(iii) Zero MVs.

In some embodiments, there can be at most two inherited affine candidates which are derived from affine motion models of the neighboring blocks, one from left neighboring CUs and one from above neighboring CUs. The candidate blocks, for example, can be located at positions shown in FIG. 9. For the left predictor, the scan order is A0>A1, and for the above predictor, the scan order is B0>B1>B2. Only the first inherited candidate from each side is selected. No pruning check is performed between two inherited candidates.

Figure 15:
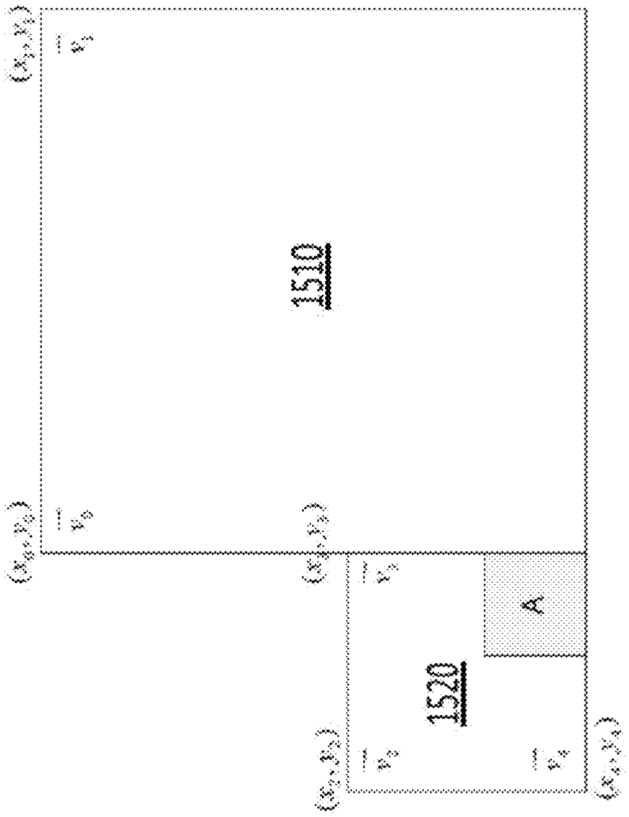
FIG. 15 shows an example of determining a control point motion vector (CPMV) candidate in an affine merge list of a current CU.

When a neighboring affine CU is identified, CPMVs of the identified neighboring affine CU are used to derive a CPMV candidate in the affine merge list of the current CU. As shown in FIG. 15, a neighbor left bottom block A of a current CU (1510) is coded in an affine mode. Motion vectors, $\vec{v_2}$, $\vec{v_3}$ and $\vec{v_4}$ of the top left corner, above right corner and left bottom corner of a CU (1520) which contains the block A are attained. When block A is coded with a 4-parameter affine model, two CPMVs $\vec{v_0}$ and $\vec{v_1}$ of the current CU (1510) are calculated according to $\vec{v_2}$, and $\vec{v_3}$. In case that block A is coded with 6-parameter affine model, three CPMVs (not shown) of the current CU are calculated according to $\vec{v_2}$, $\vec{v_3}$ and $\vec{v_4}$.

Constructed affine candidates are constructed by combining neighbor translational motion information of each control point. The motion information for the control points is derived from specified spatial neighbors and temporal neighbor shown in FIG. 16. CPMVk (k=1, 2, 3, 4) represents the k-th control point. For CPMV1, the B2>B3>A2 blocks are checked in order and the MV of the first available block is used. For CPMV2, the B1>B0 blocks are checked and for CPMV3, the A1>A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the merge candidate list.

In some embodiments, affine AMVP mode can be applied for CUs with both width and height larger than or equal to 16. An affine flag in CU level is signaled in the bitstream to indicate whether affine AMVP mode is used and then another flag is signaled to indicate whether 4-parameter affine or 6-parameter affine is used. A difference of the CPMVs of current CU and their predictors is signaled in the bitstream. An affine AVMP candidate list size is 2, and can be generated by using the following four types of CPVM candidate in order:

(i) Inherited affine AMVP candidates that are extrapolated from the CPMVs of the neighbor CUs;
(ii) Constructed affine AMVP candidates that are derived using the translational MVs of the neighbor CUs;
(iii) Translational MVs from neighboring CUs; and
(iv) Zero MVs.

The checking order of inherited affine AMVP candidates is similar to the checking order of inherited affine merge candidates in an example. The difference is that, for AVMP candidate, the affine CU that has the same reference picture as in current block is considered. No pruning process is applied when inserting an inherited affine motion predictor into the candidate list.

Figure 16:
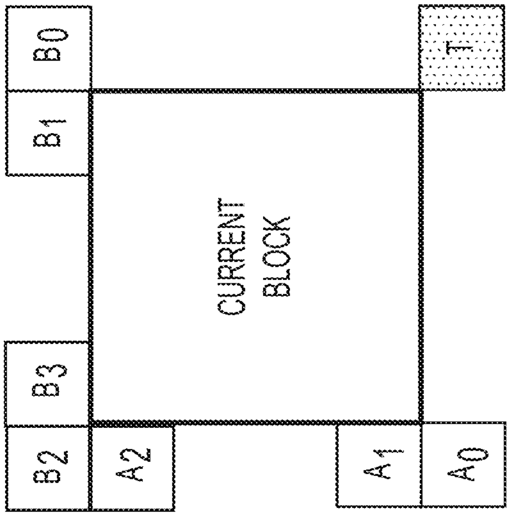
FIG. 16 shows examples of spatial neighbors and a temporal neighbor of a current block.

Constructed AMVP candidate is derived from the specified spatial neighbors shown in FIG. 16. A same checking order is used as done in affine merge candidate construction. In addition, a reference picture index of a neighboring block is also checked. The first block in the checking order that is inter coded and has the same reference picture as in current CUs is used. When the current CU is coded with a 4-parameter affine model, and CPMV0 and CPMV1 are both available, the available CPMVs are added as one candidate in the affine AMVP list. When the current CU is coded with 6-parameter affine mode, and all three CPMVs (CPMV0, CPMV1, and CPMV2) are available, the available CPMVs are added as one candidate in the affine AMVP list. Otherwise, constructed AMVP candidates are set as unavailable.

If affine AMVP list candidates is still less than 2 after inherited affine AMVP candidates and constructed AMVP candidate are checked, translational motion vectors neighboring the control points will be added to predict all control point MVs of the current CU, when available. Finally, zero MVs are used to fill the affine AMVP list if the affine AMVP list is still not full.

In an embodiment, an affine merge with motion vector difference (affine MMVD) mode can be used. An available affine merge candidate can be selected from a sub-block based merge list as a base predictor. A motion vector offset to a motion vector value of each control point from the base predictor can be applied. If no affine merge candidate is available, the affine MMVD is not used. A distance index and an offset direction index can be subsequently signaled if the affine MMVD is used.

The distance index (IDX) can be signaled to indicate which distance offset to use from the offset table, such as shown in Table 1.

TABLE 1

| Default Distance offset Table | | | | | |
|---|---|---|---|---|---|
| Distance IDX | 0 | 1 | 2 | 3 | 4 |
| Distance offset | ½-pel | 1-pel | 2-pel | 4-pel | 8-pel |

The direction index can represent four directions as shown in Table 2, where only an x direction or a y direction may have an MV difference, but not in both directions.

TABLE 2

| Default Offset direction Table | | | | |
|---|---|---|---|---|
| Offset Direction IDX | 00 | 01 | 10 | 11 |
| x-direction-factor | +1 | −1 | 0 | 0 |
| y-direction-factor | 0 | 0 | +1 | −1 |

If the inter prediction is uni-prediction, the signaled distance offset can be applied on the offset direction for each control point predictor. Results can be the MV value of each control point.

If the inter prediction is bi-prediction, the signaled distance offset can be applied on the signaled offset direction for an L0 motion vector of a control point predictor, and the offset to be applied on an L1 MV is applied on a mirrored or a scaled basis, as specified below.

If the inter prediction is the bi-prediction, the signaled distance offset is applied on the signaled offset direction for the L0 motion vector of a control point predictor. For the L1 CPMV, the offset can be applied on a mirrored basis where the same amount of distance offset with the opposite direction is applied.

In an embodiment, a POC distance based offset mirroring method can be used for the bi-prediction. When the base candidate is bi-predicted, the offset applied to L0 is as signaled, and the offset on L1 can depend on the temporal position of the reference pictures on a list 0 and a list 1. If both of the reference pictures are on a same temporal side of the current picture, the same distance offset and the same offset directions can be applied for the CPMVs of the L0 and the L1. When the two reference pictures are on different sides of the current picture, the CPMVs of the L1 can have the distance offset applied on the opposite offset direction.

In an embodiment, a POC distance based offset scaling method is used for the bi-prediction. When the base candidate is bi-predicted, the offset applied to the L0 is as signaled, and the offset applied to the L1 can be scaled based on the temporal distance of reference pictures on the list 0 and the list 1.

In an embodiment, the distance offset value range is extended into three offset tables, such as three different entries shown in Table 3. Each offset table (e.g., each row in Table 3) is adaptively selected based on a picture resolution. In an example, the offset table is selected based on the picture resolution. Referring to Table 3, a first offset table (e.g., "Distance offset 1") is selected when a picture height is larger than or equal to 1080. A second offset table (e.g., "Distance offset 2") is selected when the picture height is less than 1080 and is larger than or equal to 720. A third offset table (e.g., "Distance offset 3") is selected when the picture height is less than 720.

TABLE 3

Extended Distance Offset Table

| Distance IDX | 0 | 1 | 2 | 3 | 4 | Condition |
|---|---|---|---|---|---|---|
| Distance offset 1 | 1/2-pel | 1-pel | 2-pel | 4-pel | 8-pel | Picture Height ≥ 1080 |
| Distance offset 2 | 1/8-pel | 1/4-pel | 1/2-pel | 1-pel | 2-pel | 720 ≤ Picture Height < 1080 |
| Distance offset 3 | 1/16-pel | 1/8-pel | 1/4-pel | 1/2-pel | 1-pel | Picture Height < 720 |

Local illumination compensation (LIC) is a prediction technique, such as an inter prediction technique, to model a local illumination variation between a current block and a predictor (also referred to as a predictor block) of the current block by using a linear function. The LIC can be applied to a uni-prediction mode, but is not limited to the uni-prediction mode. The predictor can be determined based on a reference block of the current block. The reference block is in a reference picture. In an example, such as in the uni-prediction mode, an MV of the current block points from the current block to the reference block, and the predictor is the reference block of the current block. In an example, a value $p_i[x,y]$ of a sample (e.g., a reference sample) in the predictor (e.g., the reference block) is modified using a function to determine an updated value $p_f[x, y]$ of the sample in the updated predictor, such as a linear function shown in Eq. 3.

$$p_f[x, y] = \alpha \times p_i[x, y] + \beta \quad \text{Eq. 3}$$

Parameters of the linear function can be denoted by a scaling factor (also referred to as a scale) α and an offset β to compensate for illumination changes. $p_i[x, y]$ can be a reference sample at a location [x, y] on the reference picture and the reference sample can be pointed to by the MV of the current block. The scaling factor α and the offset β can be derived based on a current template (also referred to as a current block template) of the current block and a reference template (also referred to as a reference block template) of the reference block by using any suitable method, such as a least square method. In various embodiments, the scaling factor α and the offset β are not signaled, and no signaling overhead is required for the scaling factor α and the offset β. In an example, an LIC flag is signaled to indicate the use of the LIC. The LIC can be used in any suitable standard, such as in VVC and beyond VVC.

The current block can be coded based on the updated predictor, such as in a merge mode, a skip mode, or the like. The current block can be coded based on the updated predictor and additional information, such as residue data, in an AMVP mode.

In related technologies, the LIC only uses a flag (e.g., the LIC flag) to indicate whether the LIC is enabled or not, and does not have parameter adjustment to improve the accuracy of the illuminance compensation when the LIC is enabled.

According to an aspect of the disclosure, one or more parameters of a parameter set (e.g., including the scaling factor α and the offset β) of the LIC can be adjusted. The one or more parameters can be adjusted using a single index or a plurality of indices. In an example, the scaling factor α and/or the offset β are adjusted by using one or more indices.

Figure 17:
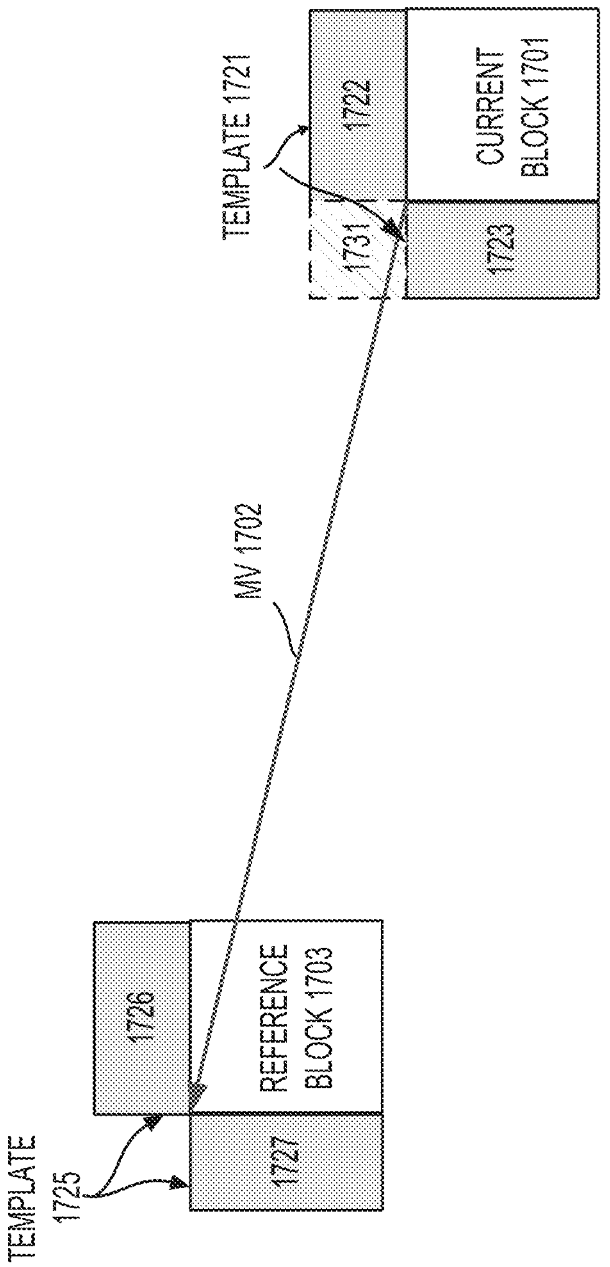
FIG. 17 shows an exemplary LIC with parameter adjustment.

FIG. 17 shows an exemplary LIC with parameter adjustment. A current block (1701) in a current picture has a current template (also referred to as a neighboring reconstructed template) (1721). The current template (1721) can have any suitable shape and any suitable size. The current template (1721) can include samples (e.g., reconstructed samples) in neighboring reconstructed block(s) of the current block (1701).

In the example shown in FIG. 17, the current template (1721) of the current block (1701) includes a top template (1722) and a left template (1723). Each of the top template (1722) and the left template (1723) can have any suitable shape and any suitable size. The top template (1722) can include samples in one or more top neighboring blocks of the current block (1701). In an example, the top template (1722) includes four rows of samples in one or more top neighboring blocks of the current block (1701). The left template (1723) can include samples in one or more left neighboring blocks of the current block (1701). In an example, the left template (1723) includes four columns of samples in the one or more left neighboring blocks of the current block (1701).

In an example, the current template of the current block (1701) includes only the top template (1722) or only the left template (1723). In an example, the current template of the current block (1701) includes the top template (1722), the left template (1723), and a top-left template (1731).

An MV (1702) of the current block (1701) can point to a reference block (1703) in a reference picture. The reference block (1703) can have a reference template, such as a reference template (1725), that corresponds to the current template (1721).

The reference template (1725) can have an identical shape and an identical size as the shape and the size of the current template, respectively. In the example in FIG. 17, the reference template (1725) of the reference block (1703) includes a top template (1726) and a left template (1727). The top template (1726) corresponding to the top template (1722) can include samples in one or more top neighboring blocks of the reference block (1703). The left template (1727) corresponding to the left template (1723) can include samples in one or more left neighboring blocks of the reference block (1703).

A predictor of the current block (1701) can be determined based on the reference block (1703). In an example, such as in the uni-prediction mode, the predictor is the reference block (1703), for example, samples values of the predictor are equal to respective samples values of the reference block (1703).

Sample values in the predictor of the current block (1701) can be modified using the LIC to compensate for local illumination variation. According to an embodiment of the disclosure, an updated value $p_f[x, y]$ of a sample (e.g., a reference sample) in the predictor can be based on a linear function of a value $p_i[x, y]$ of the sample in the predictor such as shown in Eq. 4.

$$p_f[x, y] = (\alpha + \mu_1) \times p_i[x, y] + (\beta + \mu_2 \times T_{avg}) \quad \text{Eq. 4}$$

Eq. 4 can be written as Eq. 5 below.

$$p_f[x, y] = \alpha_f \times p_i[x, y] + \beta_f \quad \text{Eq. 5}$$

In Eq. 5, a final scaling factor $\alpha_f$ is equal to a summation of the scaling factor $\alpha$ and the first parameter $\mu_1$, and a final offset $\beta_f$ is based on the offset $\beta$ and the second parameter $\mu_2$. In an example, the final offset $\beta_f$ is equal to $(\beta+\mu_2 \times T_{avg})$. Eq. 5 shows that the updated predictor can be determined based on the final scaling factor $\alpha_f$, the final offset $\beta_f$, and the predictor (e.g., the reference block (1703)).

The parameter adjustment is not applied to the LIC when the first parameter $\mu_1$ and the second parameter $\mu_2$ in Eq. 4 are zero.

As described above, the scaling factor $\alpha$ and the offset $\beta$ can be determined based on the current template (e.g., the current template (1721)) of the current block (1701) and the reference template (e.g., the reference template (1725)) of the reference block (1703) by using any suitable method, such as the least square method.

The parameter $T_{avg}$ can be determined from the reference template (e.g., the reference template (1725)) and/or the current template (e.g., the current template (1721)) of the current block (1701). In an example, the parameter $T_{avg}$ is an average value of the reference template (e.g., the reference template (1725)). For example, the parameter $T_{avg}$ is an average value of the sample values of the entire or a subset of the reference template (e.g., the reference template (1725)). In an example, the parameter $T_{avg}$ is an average value of the current template (e.g., the current template (1721)). For example, the parameter $T_{avg}$ is an average value of the sample values of the entire or a subset of the current template.

In an example, a reference template used to determine the parameter $T_{avg}$ is different from a reference template used to determine the scaling factor $\alpha$ and the offset $\beta$. In an example, a current template used to determine the parameter $T_{avg}$ is different from a current template used to determine the scaling factor $\alpha$ and the offset $\beta$.

In an example, the parameter $T_{avg}$ is 1, and thus the final offset $\beta_f$ is equal to $(\beta+\mu_2)$. Accordingly, the updated value $p_f[x, y]$ is equal to $(\alpha+\mu_1) \times p_i[x, y]+(\beta+\mu_2)$.

The first parameter $\mu_1$ and/or the second parameter $\mu_2$ can be signaled, for example indicated by LIC information of one or more blocks that include the current block (1701). In an embodiment, the LIC information of one or more blocks is signaled in a video bitstream.

The first parameter $\mu_1$ and/or the second parameter $\mu_2$ can be signaled within a limited range of values, such as from −5 to +5. In an example, the first parameter $\mu_1$ is signaled within a limited range of positive values or a limited range of negative values. In an example, the second parameter $\mu_2$ is signaled within a limited range of positive values or a limited range of negative values.

In an embodiment, the LIC information of the one or more blocks indicates one of the first parameter $\mu_1$ and the second parameter $\mu_2$, and another one of the first parameter $\mu_1$ and the second parameter $\mu_2$ can be determined based on the one of the first parameter $\mu_1$ and the second parameter $\mu_2$.

In an example, $\mu_2=-\mu_1$. The LIC information of the one or more blocks indicates the first parameter $\mu_1$, and the second parameter $\mu_2$ is determined from the first parameter $\mu_1$ as $-\mu_1$. In an example, the LIC information of the one or more blocks indicates the second parameter $\mu_2$, and the first parameter $\mu_1$ is determined from the second parameter $\mu_2$ as $-\mu_2$.

When a relationship (e.g., $\mu_2=-\mu_1$) between the first parameter $\mu_1$ and the second parameter $\mu_2$ is known, for example, to a decoder, information (e.g., the LIC information) indicating only one of the first parameter $\mu_1$ and the second parameter $\mu_2$ is signaled in the bitstream. For example, $\mu_2=-\mu_1$, the LIC information indicating only the first parameter $\mu_1$ is signaled in the bitstream. In an example, only the first parameter $\mu_1$ is signaled in the bitstream.

In an embodiment, one of (i) the first parameter $\mu_1$ and (ii) the second parameter $\mu_2$ is equal to zero, and the one of (i) the first parameter $\mu_1$ and (ii) the second parameter $\mu_2$ is not signaled. In an embodiment, the LIC information of the one or more blocks does not indicate the one of (i) the first parameter $\mu_1$ and (ii) the second parameter $\mu_2$. For example, the first parameter $\mu_1$ is equal to zero, and the LIC information of the one or more blocks does not indicate the first parameter $\mu_1$. In an example, the first parameter $\mu_1$ is equal to zero, and is not signaled in the bitstream. In an example, the second parameter $\mu_2$ is equal to zero, and is not signaled in the bitstream.

The LIC information of the one or more blocks can include (i) the first parameter $\mu_1$ and/or the second parameter $\mu_2$ or (ii) one or more indices that indicate the first parameter $\mu_1$ and/or the second parameter $\mu_2$.

The first parameter $\mu_1$ can be a floating-point value, and can be quantized with first multiple bits. The LIC information of the one or more blocks can include the first multiple bits. The second parameter $\mu_2$ can be a floating-point value, and can be quantized with second multiple bits. The LIC information of the one or more blocks can include the second multiple bits.

The LIC information of the one or more blocks can include at least one index that indicates the at least one of the first parameter $\mu_1$ or the second parameter $\mu_2$. The first parameter $\mu_1$ and/or the second parameter $\mu_2$ can be signaled by one or more indices pointing to lookup table(s).

In an example, a lookup table indicates a relationship between an index and a corresponding parameter pair (e.g., the first parameter $\mu_1$ and the second parameter $\mu_2$), and the LIC information includes a single index that indicates the first parameter $\mu_1$ and the second parameter $\mu_2$.

In an example, a first lookup table indicates a first relationship between a first index and the first parameter $\mu_1$, a second lookup table indicates a second relationship between a second index and the second parameter $\mu_2$, and thus the LIC information includes the first index that indicates the first parameter $\mu_1$ and the second index that indicates the second parameter $\mu_2$. When the first parameter $\mu_1$ or the second parameter $\mu_2$ is zero, a single index is used to indicate the first parameter $\mu_1$ or the second parameter $\mu_2$ that is not zero. When the relationship (e.g., $\mu_2=-\mu_1$) between the first parameter $\mu_1$ and the second parameter $\mu_2$ is known, a single index can be used to indicate the first parameter $\mu_1$ or the second parameter $\mu_2$.

The LIC information of the one or more blocks can be signaled at any suitable level, such as a coding unit (CU) level or a high level that is higher than the CU level (e.g., a CTU level, a slice level, or the like).

In an example, the LIC information of the one or more blocks is signaled at the CU level, the one or more blocks are in a same CU, and the first parameter $\mu_1$ and the second parameter $\mu_2$ are applicable to the CU. Different CUs can have different first parameters and/or different second parameters. For example, the first parameter $\mu_1$ and the second parameter $\mu_2$ of a first CU are different from the first parameter $\mu_1$ and the second parameter $\mu_2$ of a second CU, respectively.

In an example, the LIC information of the one or more blocks is signaled at the high level, such as the slice level. The one or more blocks include blocks in a plurality of CUS in a slice. The first parameter $\mu_1$ and the second parameter $\mu_2$ are applicable to the plurality of CUs in the slice. The plurality of CUs in the slice can have the same first parameter $\mu_1$. The plurality of CUs in the slice can have the same second parameter $\mu_2$.

In an example, the one or more indices indicating the first parameter $\mu_1$ and/or the second parameter $\mu_2$ are signaled at different levels, such as the CU level, the CTU level, the slice level, or the like.

The above embodiments can be suitably adapted when the LIC is operated at a subblock level within a CU, for example, when the LIC is performed at a subblock level within the current block. The current block can include multiple subblocks. Each subblock can include one or more samples in the current block. For example, each of the multiple subblocks is associated with an MV of the respective subblock. The MVs associated with the respective multiple subblocks can be different. Each of the MVs can point to a respective reference subblock in a reference picture. The multiple subblocks can be predicted based on the multiple reference subblocks associated with the respective MVs, respectively. In an example, the multiple subblocks are predicted using an affine merge mode, an affine AMVP mode, an affine MMVD mode, or the like.

The multiple subblocks can include a first subblock and a second subblock. The LIC information of the one or more blocks that indicates the first parameter $\mu_1$ and/or the second parameter $\mu_2$ can apply to one or more of the multiple subblocks in the current block. The first parameter $\mu_1$ and the second parameter $\mu_2$ can apply to the multiple subblocks. For example, the first subblock and the second subblock have the same first parameter $\mu_1$, and the first subblock and the second subblock have the same second parameter $\mu_2$.

In an embodiment, each subblock has a respective derived parameter set used in the LIC.

For the first subblock in the current block, Eq. 4 can be adapted into Eq. 6. An updated value $p_{f1}[x_1, y_1]$ of a first sample in a first predictor subblock (e.g., a first reference subblock) can be a linear function of a value $p_{i1}[x_1, y_1]$ of the first sample.

$$p_{f1}[x_1, y_1] = (\alpha_{i1} + \mu_1) \times p_{i1}[x_1, y_1] + (\beta_{i1} + \mu_2 \times T_{avg,1}) \quad \text{Eq. 6}$$

A first MV of the first subblock points to the first reference subblock. A first initial scaling factor $\alpha_{i1}$ and a first initial offset $\beta_{i1}$ are associated with the first subblock to compensate for a local illumination change to the first subblock. A parameter $T_{avg,1}$ can be associated with the first subblock to compensate for the local illumination change to the first subblock. The first initial scaling factor $\alpha_{i1}$ and the first initial offset $\beta_{i1}$ can be determined based on a first portion of the current template and a first portion of the reference template. For example, the first portion of the current template includes samples of reconstructed spatially neighboring block(s) of the first subblock. The first portion of the reference template includes samples of reconstructed spatially neighboring block(s) of the first reference subblock. The parameter $T_{avg,1}$ can be determined based on the first portion of the current template and/or the first portion of the reference template.

For the second subblock in the current block, Eq. 4 can be adapted into Eq. 7. An updated value $p_{f2}[x_2, y_2]$ of a second sample in a second predictor subblock (e.g., a second reference subblock) in the predictor can be a linear function of a value $p_{i2}[x_2, y_2]$ of the second sample.

$$p_{f2}[x_2, y_2] = (\alpha_{i2} + \mu_1) \times p_{i2}[x_2, y_2] + (\beta_{i2} + \mu_2 \times T_{avg,2}) \quad \text{Eq. 7}$$

A second MV of the second subblock points to the second reference subblock. A second initial scaling factor $\alpha_{i2}$ and a second initial offset $\beta_{i2}$ are associated with the second subblock to compensate for a local illumination change to the second subblock. A parameter $T_{avg,2}$ can be associated with the second subblock to compensate for the local illumination change to the second subblock. The second initial scaling factor $\alpha_{i2}$ and the second initial offset $\beta_{i2}$ can be determined based on a second portion of the current template and a second portion of the reference template. For example, the second portion of the current template includes samples of reconstructed spatially neighboring block(s) of the second subblock. The second portion of the reference template includes samples of reconstructed spatially neighboring block(s) of the second reference subblock. The parameter $T_{avg,2}$ can be determined based on the second portion of the current template and/or the second portion of the reference template.

In an embodiment, the multiple subblocks share a same derived parameter set (e.g., including the first initial scaling factor $\alpha_{i1}$, the first initial offset $\beta_{i1}$, and/or the parameter $T_{avg,1}$). For example, the first initial scaling factor $\alpha_{i1}$ is equal to the second initial scaling factor $\alpha_{i2}$, and the first initial offset $\beta_{i1}$ is equal to the second initial offset $\beta_{i2}$. In an example, the parameter $T_{avg,1}$ is equal to the parameter $T_{avg,2}$. The shared parameter set of the multiple subblocks can be determined based on the current template and the reference template. In an example, the reference template can be determined based on boundary subblocks of the current block that are neighbors of other block(s) that are outside the current block. For example, MVs associated with the boundary subblocks can point to a plurality of subblocks in the reference block, and the reference template includes samples of reconstructed spatially neighboring block(s) of the plurality of subblocks in the reference block. In an example, the reference template includes the first portion of the reference template that can be determined based on the first MV and the second portion of the reference template that can be determined based on the second MV.

Figure 18:
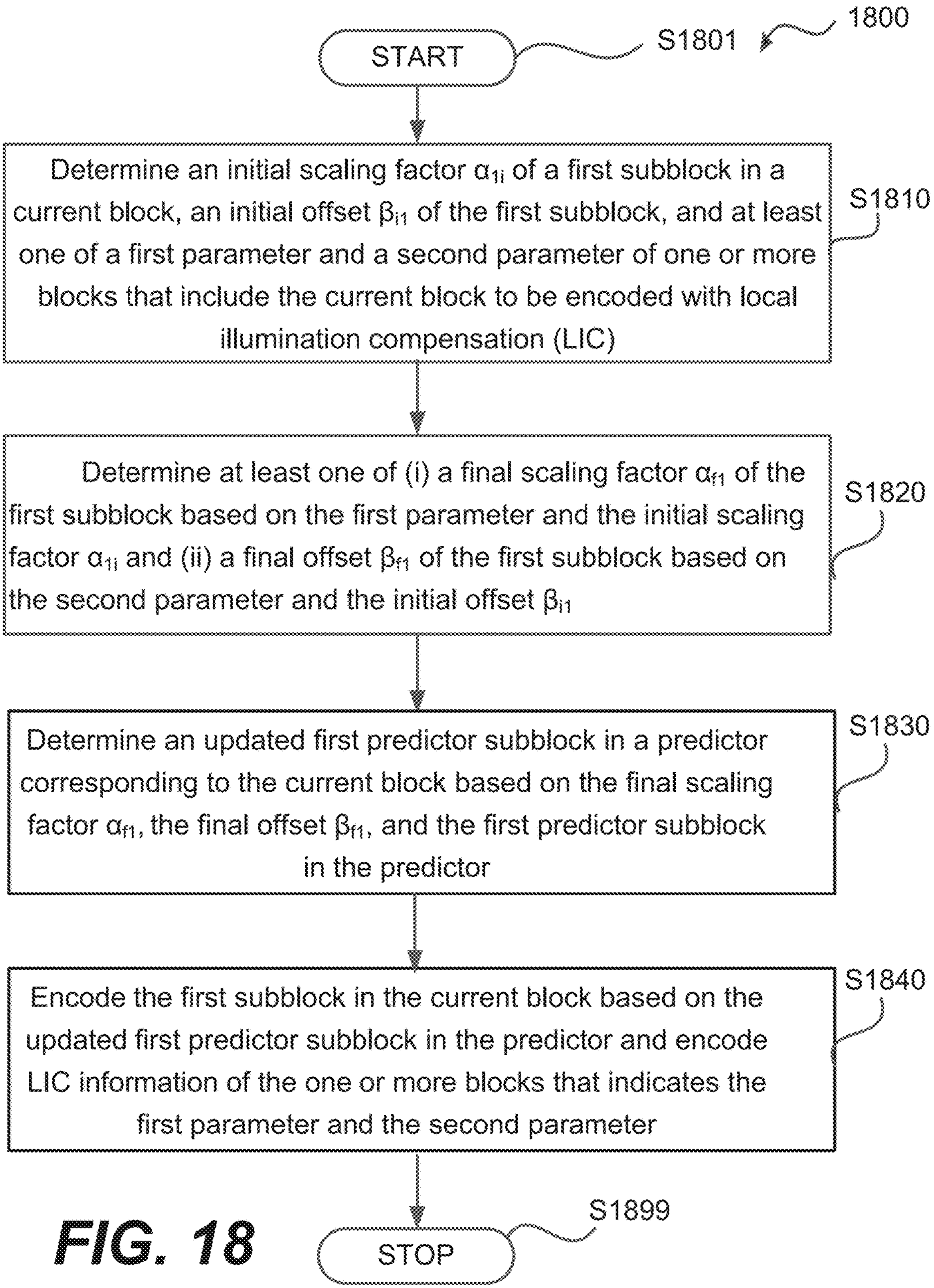
FIG. 18 shows a flow chart outlining an encoding process according to an embodiment of the disclosure.

FIG. 18 shows a flow chart outlining an encoding process (1800) according to an embodiment of the disclosure. In various embodiments, the process (1800) is executed by processing circuitry, such as the processing circuitry in the terminal devices (310), (320), (330) and (340), processing circuitry that performs functions of a video encoder (e.g., (403), (603), (703)), or the like. In some embodiments, the process (1800) is implemented in software instructions, thus when the processing circuitry executes the software instructions, the processing circuitry performs the process (1800). The process starts at (S1801), and proceeds to (S1810).

At (S1810), an initial scaling factor $\alpha_{i1}$ of a first subblock in a current block, an initial offset $\beta_{i1}$ of the first subblock, and at least one of a first parameter $\mu_1$ and a second parameter $\mu_2$ of one or more blocks can be determined. The one or more blocks can include the current block to be encoded with the LIC. A first MV of the first subblock points to a first reference block of a reference block in a reference picture. The reference block corresponds to the current block.

The initial scaling factor $\alpha_{i1}$ of the first subblock in the current block and the initial offset $\beta_{i1}$ of the first subblock in the current block can be determined based on a first portion of a current template of the current block and a first portion of a reference template of a reference block.

In an example, the initial scaling factor $\alpha_{i1}$ of the first subblock in the current block and the initial offset $\beta_{i1}$ of the first subblock in the current block can be determined based on the current template of the current block and the reference template of the reference block.

The first parameter $\mu_1$ of the one or more blocks and/or the second parameter $\mu_2$ of the one or more blocks can be determined based on the one or more blocks.

In an example, a high level (e.g., a CTU or a slice) that is higher than a CU includes first block(s) coded with the LIC and second block(s) not coded with the LIC. The first block(s) can have an identical first parameter $\mu_1$ and an identical second parameter $\mu_2$, for example, determined based on one or more of the first block(s). Alternatively, the first block(s) can have different first parameters $\mu_1$ and different second parameters $\mu_2$.

At (S1820), in an example, a final scaling factor $\alpha_{f1}$ of the first subblock is determined based on the first parameter $\mu_1$ and the initial scaling factor $\alpha_{i1}$. For example, the final scaling factor $\alpha_{f1}$ of the first subblock in the current block is determined to be a summation of the first parameter $\mu_1$ of the one or more blocks and the initial scaling factor $\alpha_{i1}$ of the first subblock in the current block.

In an example, a final offset $\beta_{f1}$ of the first subblock is determined based on the second parameter $\mu_2$ and the initial offset $\beta_{i1}$. For example, a parameter $T_{avg,1}$ of the first subblock in the current block is determined based on at least one of the first portion of the current template or the first portion of the reference template. The final offset $\beta_{f1}$ of the first subblock in the current block is determined to be $(\beta_{i1}+\mu_2\times T_{avg,1})$.

In an example, the parameter $T_{avg,1}$ can be determined based on the current template of the current block and the reference template of the reference block.

At (S1830), an updated first predictor subblock (e.g., an updated first reference subblock) in a predictor (e.g., the reference block) corresponding to the current block can be determined based on the final scaling factor $\alpha_{f1}$, the final offset $\beta_{f1}$, and the first predictor subblock (e.g., the first reference subblock) in the predictor.

At (S1840), the first subblock in the current block can be encoded based on the updated first predictor subblock. The LIC information of the one or more blocks that indicates the first parameter $\mu_1$ and/or the second parameter $\mu_2$ can be encoded.

The encoded LIC information of the one or more blocks can be signaled in a video bitstream. The LIC information of the one or more blocks can be signaled at a coding unit (CU) level or at a level that is higher than the CU level.

In an example, one of (i) the first parameter $\mu_1$ and (ii) the second parameter $\mu_2$ is equal to zero, and the LIC information of the one or more blocks does not indicate the one of (i) the first parameter $\mu_1$ and (ii) the second parameter $\mu_2$.

In an example, the LIC information of the one or more blocks includes at least one index that indicates the at least one of the first parameter $\mu_1$ or the second parameter $\mu_2$.

In an example, the at least one of the first parameter $\mu_1$ or the second parameter $\mu_2$ is a floating-point value and is quantized with multiple bits, and the LIC information of the one or more blocks includes the multiple bits.

The process (1800) then proceeds to (S1899), and terminates.

The process (1800) can be suitably adapted to various scenarios and steps in the process (1800) can be adjusted accordingly. One or more of the steps in the process (1800) can be adapted, omitted, repeated, and/or combined. Any suitable order can be used to implement the process (1800). Additional step(s) can be added.

In an example, the LIC information of the one or more blocks indicates one of (i) the first parameter $\mu_1$ and (ii) the second parameter $\mu_2$, and another one of (i) the first parameter $\mu_1$ and (ii) the second parameter $\mu_2$ is determined based on the one of (i) the first parameter $\mu_1$ and (ii) the second parameter $\mu_2$.

In an embodiment, the first subblock in the current block is the current block, the first predictor subblock in the predictor is the predictor (e.g., the reference block), the first portion of the current template is the current template, and the first portion of the reference template is the reference template. In an example, the updated predictor is determined using Eq. 4 or Eq. 5.

In an embodiment, the current block includes the first subblock and a second subblock, the at least one of the first parameter $\mu_1$ or the second parameter $\mu_2$ indicated in the LIC information of the one or more blocks apply to the first subblock and the second subblock. The second subblock is associated with another initial scaling factor $\alpha_{i2}$ that can be identical to or different from the initial scaling factor $\alpha_{i1}$ of the first subblock and another initial offset $\beta_{i2}$ that can be identical to or different from the initial offset $\beta_{i1}$ of the first subblock. An updated second predictor subblock (e.g., an updated second reference subblock) in the predictor that corresponds to the second subblock can be determined using Eq. 7. The second subblock can be encoded based on the updated second predictor subblock.

Figure 19:
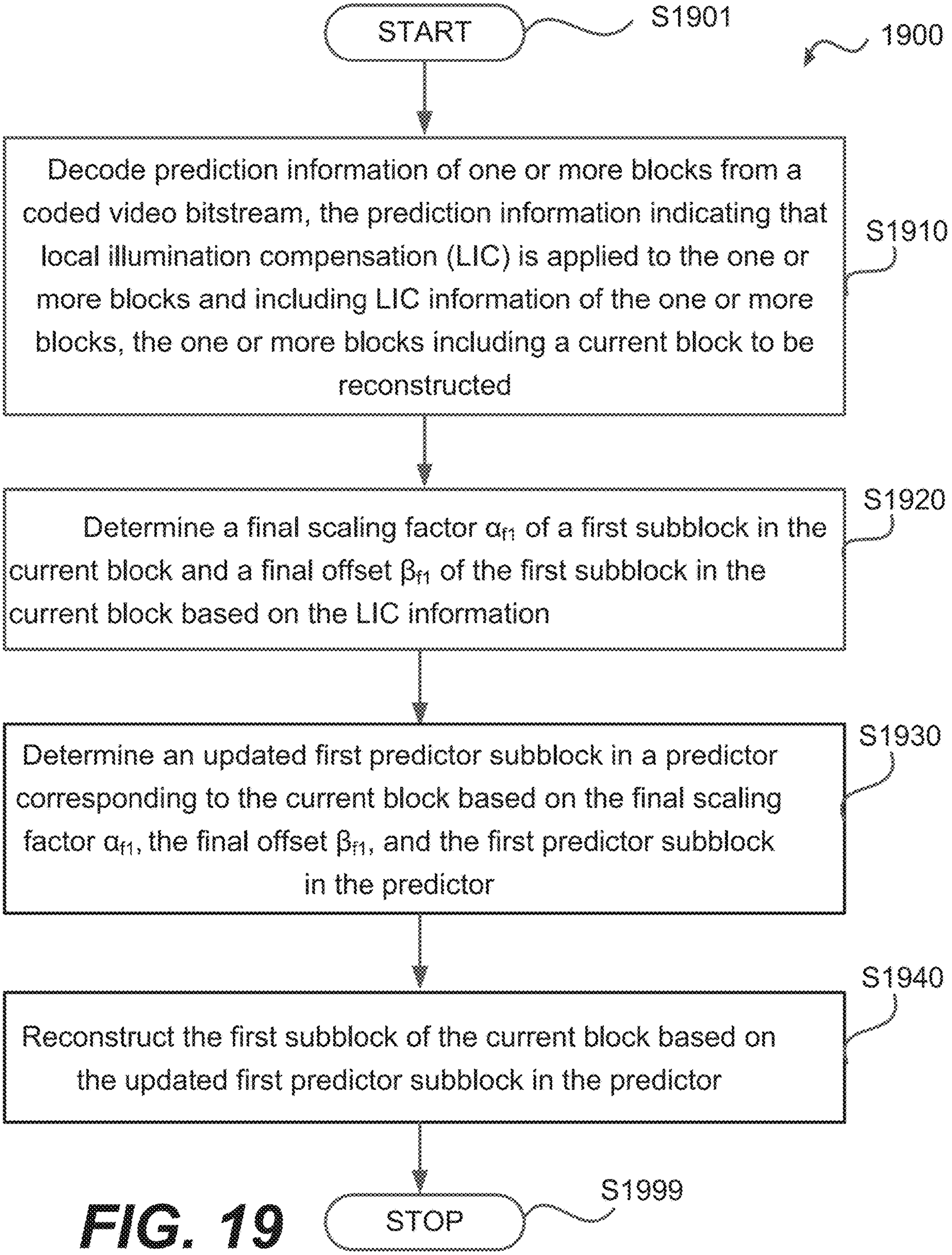
FIG. 19 shows a flow chart outlining a decoding process according to an embodiment of the disclosure.

FIG. 19 shows a flow chart outlining a decoding process (1900) according to an embodiment of the disclosure. In various embodiments, the process (1900) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901), and proceeds to (S1910).

At (S1910), prediction information of one or more blocks can be decoded from a coded video bitstream. The prediction information can indicate that local illumination compensation (LIC) is applied to the one or more blocks and include LIC information of the one or more blocks that include a current block to be reconstructed.

In an example, the LIC information of the one or more blocks is signaled at a coding unit (CU) level.

In an example, the LIC information of the one or more blocks is signaled at a level that is higher than the CU level.

At (S1920), a final scaling factor $\alpha_{f1}$ of a first subblock in the current block and a final offset $\beta_{f1}$ of the first subblock in the current block can be determined based on the LIC information.

In an embodiment, an initial scaling factor $\alpha_{i1}$ of the first subblock in the current block and an initial offset $\beta_{i1}$ of the first subblock in the current block are determined based on a first portion of a current template of the current block and a first portion of a reference template of a reference block.

In an example, the initial scaling factor $\alpha_{i1}$ of the first subblock in the current block and the initial offset $\beta_{i1}$ of the first subblock in the current block can be determined based on the current template of the current block and the reference template of the reference block.

The LIC information of the one or more blocks can be signaled in the coded video bitstream and can indicate at least one of a first parameter $\mu_1$ of the one or more blocks or a second parameter $\mu_2$ of the one or more blocks. The final scaling factor $\alpha_{f1}$ of the first subblock in the current block can be determined based on the first parameter $\mu_1$ of the one or more blocks and the initial scaling factor $\alpha_{i1}$ of the first subblock in the current block. The final offset $\beta_{f1}$ of the first subblock in the current block can be determined based on the second parameter $\mu_2$ of the one or more blocks and the initial offset $\beta_{i1}$ of the first subblock in the current block.

In an example, the final scaling factor $\alpha_{f1}$ of the first subblock in the current block is determined to be a summation of the first parameter $\mu_1$ of the one or more blocks and the initial scaling factor $\alpha_{i1}$ of the first subblock in the current block.

In an example, a parameter $T_{avg,1}$ of the first subblock in the current block is determined based on at least one of the first portion of the current template or the first portion of the reference template, and the final offset $\beta_{f1}$ of the first subblock in the current block is determined to be $(\beta_{i1}+\mu_2\times T_{avg,1})$.

In an example, the parameter $T_{avg,1}$ can be determined based on the current template of the current block and the reference template of the reference block.

In an example, the LIC information of the one or more blocks indicates one of (i) the first parameter $\mu_1$ and (ii) the second parameter $\mu_2$, and another one of (i) the first parameter $\mu_1$ and (ii) the second parameter $\mu_2$ is determined based on the one of (i) the first parameter $\mu_1$ and (ii) the second parameter $\mu_2$.

In an example, one of (i) the first parameter $\mu_1$ and (ii) the second parameter $\mu_2$ is equal to zero, and the LIC information of the one or more blocks does not indicate the one of (i) the first parameter $\mu_1$ and (ii) the second parameter $\mu_2$.

In an example, the LIC information of the one or more blocks includes at least one index that indicates the at least one of the first parameter $\mu_1$ or the second parameter $\mu_2$.

In an example, the at least one of the first parameter $\mu_1$ or the second parameter $\mu_2$ is a floating-point value and is quantized with multiple bits, and the LIC information of the one or more blocks includes the multiple bits.

At (S1930), an updated first predictor subblock in a predictor corresponding to the current block can be determined based on the final scaling factor $\alpha_{f1}$, the final offset $\beta_{f1}$, and the first predictor subblock in the predictor. As described above, the predictor can be determined based on the reference block. In an example, the predictor is the reference block, for example, samples values of the predictor are equal to respective samples values of the reference block. An updated value of a first sample in the first predictor subblock in the predictor can be equal to $\alpha_{f1}\times p_{i1}+\beta_{f1}$. $p_{i1}$ can be a value of the first sample in the first predictor subblock in the predictor.

At (S1940), the first subblock in the current block can be reconstructed based on the updated first predictor subblock in the predictor.

In an example, sample values in the first subblock in the current block are equal to corresponding sample values in the updated first predictor subblock in the predictor.

In an example, the first subblock in the current block is reconstructed based on the updated first predictor subblock in the predictor and additional information (e.g., residue data).

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added.

In an embodiment, the first subblock in the current block is the current block, the first predictor subblock in the predictor is the predictor (e.g., the reference block of the current block), the first portion of the current template is the current template, and the first portion of the reference template is the reference template of the reference block. In an example, the updated predictor is determined using Eq. 4 or Eq. 5.

In an embodiment, the current block includes the first subblock and a second subblock, the at least one of the first parameter $\mu_1$ or the second parameter $\mu_2$ indicated in the LIC information of the one or more blocks apply to the first subblock and the second subblock. The second subblock is associated with another initial scaling factor $\alpha_{i2}$ that can be identical to or different from the initial scaling factor $\alpha_{i1}$ of the first subblock and another initial offset $\beta_{i2}$ that can be identical to or different from the initial offset $\beta_{i1}$ of the first subblock. An updated second predictor subblock in the predictor that corresponds to the second subblock can be determined using Eq. 7. The second subblock can be encoded based on the updated second predictor subblock.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
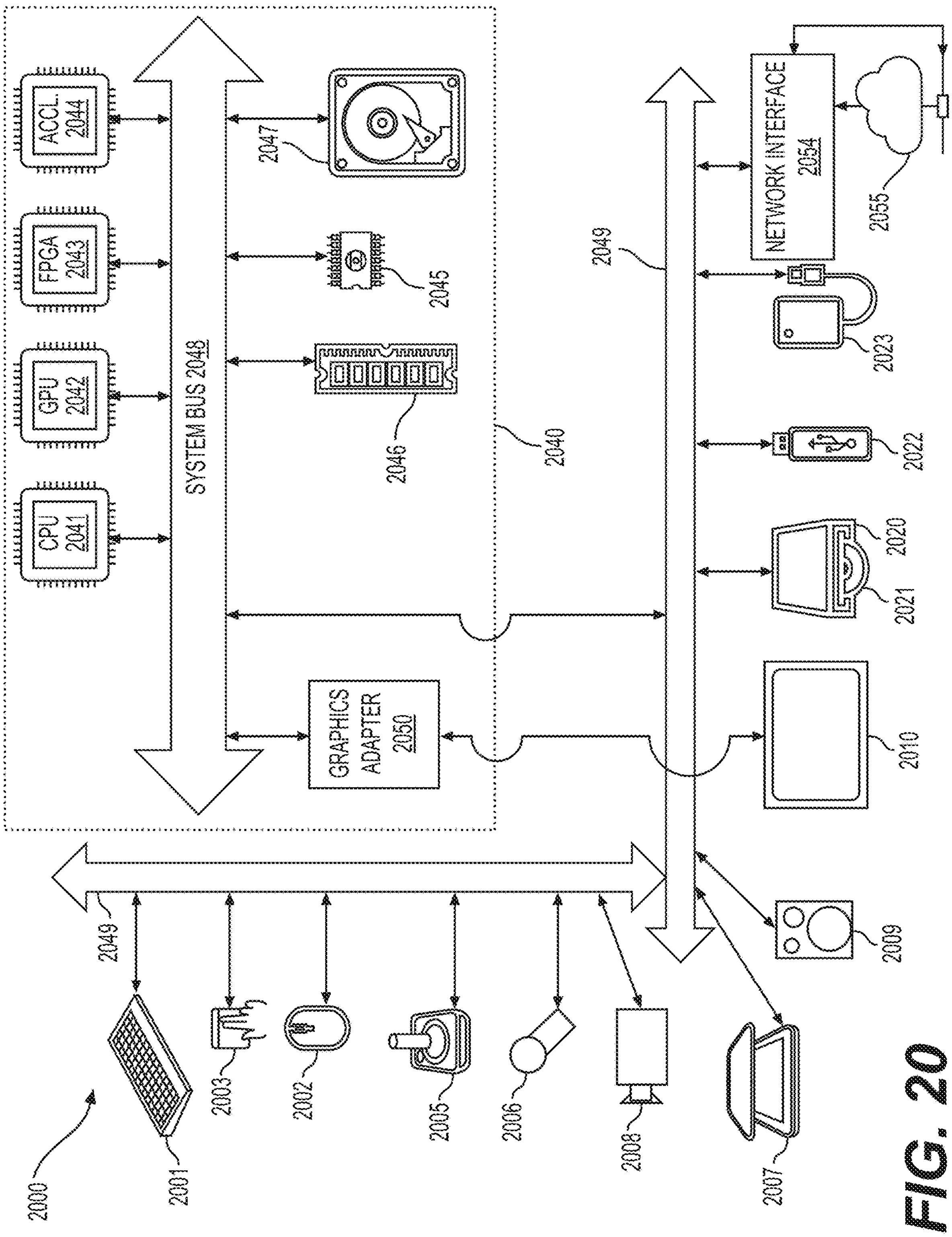
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch-screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:

decoding prediction information of a current block from a coded video bitstream, the prediction information indicating that local illumination compensation (LIC) is applied to the current block and indicating an adjustment parameter u used to adjust at least one parameter of the LIC;

determining at least one of (i) a final scaling parameter $\alpha_f$ of the current block based on the adjustment parameter u and an initial scaling parameter $\alpha_i$ that is included in the at least one parameter of the LIC and (ii) a final offset parameter $\alpha_f$ of the current block based on the adjustment parameter u and an initial offset parameter $\beta_i$ that is included in the at least one parameter of the LIC;

determining an updated predictor of the current block based on (i) the at least one of the final scaling parameter $\alpha_f$ and the final offset parameter $\beta_f$ and (ii) the predictor; and reconstructing the current block based on the updated predictor.

2. The method of claim 1, wherein the adjustment parameter u is signaled in the coded video bitstream; and the decoding includes obtaining the adjustment parameter u from the coded video bitstream.

3. The method of claim 1, wherein the determining the at least one of (i) the final scaling parameter $\alpha_f$ and (ii) the final offset parameter $\beta_f$ includes determining (i) the final scaling parameter $\alpha_f$ and (ii) the final offset parameter $\beta_f$, the final offset parameter Br being determined based on the initial offset parameter $\beta_i$, the adjustment parameter u, and a reference template of a reference block, the predictor being based on the reference block; and the determining the updated predictor comprises: determining the updated predictor based on the final scaling parameter $\alpha_f$, the final offset parameter $\beta_f$ of the current block, and the predictor, an updated value of a sample in the predictor being equal to $\alpha_f \times p_i + \beta_f$, $p_i$ being a value of the sample in the predictor.

4. The method of claim 3, wherein the initial scaling parameter ai of the current block and the initial offset parameter $\alpha_f$ of the current block are determined based on a current template of the current block and the reference template of the reference block.

5. The method of claim 4, wherein the current template of the current block includes a top template that is above the current block and a left template that is to the left of the current block.

6. The method of claim 4, wherein the current template of the current block is a top template that is above the current block.

7. The method of claim 4, wherein the current template of the current block is a left template that is to the left of the current block.

8. The method of claim 1, wherein the prediction information of the current block includes an index that indicates the adjustment parameter u.

9. The method of claim 1, wherein the adjustment parameter u is a floating-point value and is quantized with multiple bits, and the prediction information of the current block includes the multiple bits.

10. The method of claim 1, wherein the determining the final scaling parameter $\alpha_f$ comprises:

determining the final scaling parameter $\alpha_f$ of the current block to be a sum of the adjustment parameter u and the initial scaling parameter $\alpha_i$ of the current block.

11. The method of claim 1, wherein the prediction information indicating the adjustment parameter u is signaled at a coding unit (CU) level in the coded video bitstream.

12. The method of claim 1, wherein the prediction information indicating the adjustment parameter u is signaled at a level that is higher than a coding unit (CU) level in the coded video bitstream.

13. A method for video encoding in a video encoder, comprising:

determining an initial scaling parameter ai of a current block, an initial offset parameter $\beta_i$ of the current block, and an adjustment parameter u used to adjust at least one of the initial scaling parameter $\alpha_i$ and the initial offset parameter $\beta_i$ in local illumination compensation (LIC) that is to be applied to the current block;

determining at least one of (i) a final scaling parameter $\alpha_f$ of the current block based on the adjustment parameter u and the initial scaling parameter $\alpha_i$ and (ii) a final offset parameter $\beta_f$ of the current block based on the adjustment parameter u and the initial offset parameter $\beta_i$;

determining an updated predictor of the current block based on (i) the at least one of the final scaling parameter $\alpha_f$ and the final offset parameter $\beta_f$ and (ii) a predictor of the current block;

encoding, in a bitstream, prediction information that indicates the adjustment parameter u; and encoding, in the bitstream, the current block based on the updated predictor.

14. The method of claim 13, wherein the encoding the prediction information includes encoding the adjustment parameter u in the bitstream.

15. The method of claim 13, wherein the determining the at least one of (i) the final scaling parameter $\alpha_f$ and (ii) the final offset parameter $\beta_f$ includes determining (i) the final scaling parameter $\alpha_f$ and (ii) the final offset parameter $\beta_f$, the final offset parameter $\beta_f$ being determined based on the initial offset parameter $\beta_i$, the adjustment parameter u, and a reference template of a reference block, the predictor being based on the reference block; and the determining the updated predictor comprises: determining the updated predictor based on the final scaling parameter $\alpha_f$, the final offset parameter $\beta_f$ of the current block, and the predictor, an updated value of a sample in the updated predictor being equal to $\alpha_f \times p_i + \beta_f$, $p_i$ being a value of the sample in the predictor.

16. The method of claim 3, wherein the determining the final offset parameter $\beta_f$ comprises:

determining the final offset parameter $\beta_f$ of the current block based on (i) the initial offset parameter $\beta_i$, (ii) the adjustment parameter u, and (iii) an averaged value $T_{avg}$ of samples in the reference template of the reference block.

17. The method of claim 16, wherein $$\alpha_f = \alpha_i + u,$$

$$\beta_f = \beta_i - u \times T_{avg}, \text{ and}$$

the updated value of the sample in the updated predictor is equal to $(\alpha_i + u) \times p_i + (\beta_i - u \times T_{avg})$.

18. The method of claim 1, wherein the determining the at least one of (i) the final scaling parameter $\alpha_f$ and (ii) the final offset parameter $\beta_f$ comprises:

determining the final offset parameter $\beta_f$ of the current block based on (i) the initial offset parameter $\beta_i$, (ii) the adjustment parameter u, and (iii) an averaged value $T_{avg}$ of samples in a reference template of a reference block, the predictor being based on the reference block, the final scaling parameter $\alpha_f$ of the current block being equal to the initial scaling parameter $\alpha_i$.

19. The method of claim 18, wherein $\beta_f = \beta_i + u \times T_{avg}$.

20. A non-transitory computer-readable storage medium storing instructions which when executed by a processor cause the processor to perform a method of encoding a bitstream comprising:

determining an initial scaling parameter $\alpha_i$ of a current block, an initial offset parameter $\beta_i$ of the current block, and an adjustment parameter u used to adjust at least one of the initial scaling parameter $\alpha_i$ and the initial offset parameter $\beta_i$ in local illumination compensation (LIC) that is to be applied to the current block;

determining at least one of (i) a final scaling parameter $\alpha_f$ of the current block based on the adjustment parameter u and the initial scaling parameter $\alpha_i$ and (ii) a final offset parameter $\beta_f$ of the current block based on the adjustment parameter u and the initial offset parameter $\beta_i$;

determining an updated predictor of the current block based on (i) the at least one of the final scaling parameter $\alpha_f$ and the final offset parameter $\beta_f$ and (ii) a predictor of the current block;

encoding, in the bitstream, prediction information that indicates the adjustment parameter u;

encoding, in the bitstream, the current block based on the updated predictor; and transmitting the encoded bitstream.

* * * * *